United States Patent
Kitahara et al.

(10) Patent No.: US 11,956,159 B2
(45) Date of Patent: Apr. 9, 2024

(54) TRANSMISSION DEVICE, TRANSMISSION METHOD, RECEPTION DEVICE, AND RECEPTION METHOD

(71) Applicant: SATURN LICENSING LLC, New York, NY (US)

(72) Inventors: Jun Kitahara, Shizuoka (JP); Naohisa Kitazato, Tokyo (JP); Yasuaki Yamagishi, Kanagawa (JP); Kazuyuki Takahashi, Chiba (JP); Taketoshi Yamane, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/881,343

(22) Filed: Aug. 4, 2022

(65) Prior Publication Data

US 2022/0377018 A1    Nov. 24, 2022

Related U.S. Application Data

(63) Continuation of application No. 15/301,547, filed as application No. PCT/JP2016/052583 on Jan. 29, 2016, now Pat. No. 11,444,885.

(30) Foreign Application Priority Data

Feb. 10, 2015 (JP) ................................ 2015-024779
Mar. 4, 2015 (JP) ................................ 2015-042752

(51) Int. Cl.
*H04L 47/34* (2022.01)
*H04H 20/28* (2008.01)
(Continued)

(52) U.S. Cl.
CPC ............. *H04L 47/34* (2013.01); *H04H 20/28* (2013.01); *H04H 20/95* (2013.01); *H04L 47/24* (2013.01);
(Continued)

(58) Field of Classification Search
None
See application file for complete search history.

(56) References Cited

U.S. PATENT DOCUMENTS 5,502,726 A  *  3/1996  Fischer ................... H04L 47/24
                                                        370/392
6,505,347 B1    1/2003  Kaneko et al.
(Continued)

FOREIGN PATENT DOCUMENTS

CN    102301702 A    12/2011
CN    103460622 A    12/2013
(Continued)

OTHER PUBLICATIONS

ATSC Advanced Television Systems Committee: "ATSC Mobile DTV Standard: A/153 Part 3, Service Multiplex and Transport Subsystem Characteristics", Doc. A/153 Part3:2013, Oct. 29, 2013, 80 pages.

*Primary Examiner* — John W Miller
*Assistant Examiner* — Sean N. Haiem
(74) *Attorney, Agent, or Firm* — Jeffery J. Brosemer

(57) ABSTRACT

The present technology relates to a transmission device, a transmission method, a reception device, and a reception method with each of which it becomes possible to perform transmission of control information according to an operation form. The reception device receives first data that includes control information, which includes information necessary for channel selection of a service, and transmission sequence information indicating a sequence in which the control information is transmitted and that is transmitted in a transmission sequence corresponding to the transmission sequence information, and controls processing on second data, which includes data of a component included in the service, on the basis of the control information acquired (Continued)

according to the transmission sequence information. The present technology can be applied, for example, to a television receiver.

14 Claims, 29 Drawing Sheets

(51) Int. Cl.
    *H04H 20/95*     (2008.01)
    *H04L 47/24*     (2022.01)
    *H04L 69/22*     (2022.01)
    *H04N 21/2362*     (2011.01)
    *H04N 21/434*     (2011.01)

(52) U.S. Cl.
    CPC ......... *H04L 69/22* (2013.01); *H04N 21/2362* (2013.01); *H04N 21/434* (2013.01)

(56) References Cited

U.S. PATENT DOCUMENTS

| | | | |
|---|---|---|---|
| 7,986,715 B2* | 7/2011 | Song | H04N 21/4381 370/522 |
| 2006/0123097 A1* | 6/2006 | Paila | H04N 21/84 709/218 |
| 2009/0034556 A1* | 2/2009 | Song | H04N 21/23614 370/471 |
| 2009/0055866 A1* | 2/2009 | Song | H04L 12/18 725/39 |
| 2009/0080574 A1* | 3/2009 | Choi | H04N 21/4382 375/340 |
| 2009/0083795 A1* | 3/2009 | Lee | H04N 21/41407 725/39 |
| 2010/0205507 A1* | 8/2010 | Song | H04N 21/4345 714/776 |
| 2010/0268964 A1* | 10/2010 | Carrel | H04N 21/4623 713/189 |
| 2011/0228876 A1* | 9/2011 | Song | H04N 21/4348 375/295 |
| 2013/0034032 A1* | 2/2013 | Vare | H04W 4/06 370/310 |
| 2013/0167172 A1* | 6/2013 | Suh | H04N 21/8126 725/32 |
| 2015/0010018 A1 | 1/2015 | Yang et al. | |
| 2016/0219394 A1* | 7/2016 | Van Phan | H04W 48/14 |

FOREIGN PATENT DOCUMENTS

| | | |
|---|---|---|
| CN | 104202617 A | 12/2014 |
| JP | H11163814 | 6/1999 |
| JP | 2008263616 A | 10/2008 |
| KR | 20100074818 A | 7/2010 |

* cited by examiner

FIG. 14

| Syntax | Num of bits | Mnemonic | Description |
|---|---|---|---|
| FIT( | | | |
|   FIT_protocol_version | 8 | uimsbf | Protocol version |
|   Broadcast_stream_id | 16 | uimsbf | Broadcast Stream ID |
|   num_services | 8 | uimsbf | Number of services |
|   class_id | 4 | bsibf | class_id |
|   version | 8 | bsibf | FIT version |
|   for(i=0; i<num_services; i++){ | | | |
|     service_id | 16 | | Service ID |
|     provider_id | 16 | | Provider ID |
|     service_category | 5 | | Service category(linear TV, NRT, ESG, audio, etc.) |
|     sp_indicator | 1 | | Service protection |
|     SLS_simpleservice | 1 | | Broadcast simple service or not |
|     reserved | 1 | | |
|     num_srv_level_descriptor | 4 | | number of service level descriptor |
|     for(j=0; j<num_srv_level_descriptor; j++){ | | | |
|       srv_level_descriptor () | | | |
|     } | | | |
|     reserved | 4 | | |
|   } | | | |
|   num_FIT_level_descriptor | 4 | | number of FIT level descriptor |
|   for(i=0; i<num_FIT_level_descriptor; i++){ | | | |
|     FIT_level_descriptor() | | | |
|   } | | | |
|   reserved | 4 | | |
| } | | | |

FIG. 15

| Syntax | Num of bits | Mnemonic | Description |
|---|---|---|---|
| service_status_descriptor{ | | | |
| descriptor_tag | 8 | uimsbf | descriptor tag |
| descriptor_length | 8 | uimsbf | descriptor length |
| SLS_data_version | 8 | uimsbf | number of services |
| service_status | 3 | uimsbf | service status(active, inactive, show, hidden) |
| reserved | 5 | bslbf | |
| } | | | |

FIG. 16

| Syntax | Num of bits | Mnemonic | Description |
|---|---|---|---|
| service_name_descriptor{ | | | |
| descriptor_tag | 8 | uimsbf | descriptor tag |
| descriptor_length | 8 | uimsbf | descriptor length |
| ISO_639_language_code | 24 | bslbf | ISO 639 2 language code |
| short_service_name_length | 3 | uimsbf | short service name length |
| reserved | 5 | bslbf | |
| short_service_name | 16*N | uimsbf | shot service name |
| } | | | |

FIG. 17

| Syntax | Num of bits | Mnemonic | Description |
|---|---|---|---|
| capability_descriptor( | | | |
| descriptor_tag | 8 | uimsbf | descriptor tag |
| descriptor_length | 8 | uimsbf | descriptor length |
| capability_code | 8 | uimsbf | capability code |
| } | | | |

FIG. 18

| Syntax | Num of bits | Mnemonic | Description |
|---|---|---|---|
| service_bootstrap_descriptor { | | | |
| descriptor_tag | 8 | uimsbf | descriptor tag |
| descriptor_length | 8 | uimsbf | descriptor length |
| IP_version_flag | 1 | bslbf | IP version flag |
| SLS_src_IP_addr_flag | 1 | bslbf | source IP address flag(IPv4 for IPv6) |
| reserved | 6 | bslbf | |
| if(SLS_src_IP_addr_flag) { | | | |
| SLS_src_IP_addr | 32 or 128 | uimsbf | source IP address |
| } | | | |
| SLS_dst_IP_addr | 32 or 128 | uimsbf | SLS destination IP address |
| SLS_dst_port_num | 16 | uimsbf | SLS destination port number |
| SLS_TSI | 16 | uimsbf | SLS TSI |
| SLS_PLP_id | 8 | uimsbf | SLS PLP ID |
| } | | | |

FIG. 19

| Syntax | Num of bits | Mnemonic | Description |
|---|---|---|---|
| signaling_template_descriptor{ | | | |
| descriptor_tag | 8 | uimsbf | descriptor tag |
| descriptor_length | 8 | uimsbf | descriptor length |
| encoding_type | 4 | bslbf | encoding type |
| reserved | 4 | bslbf | |
| template_length | 16 | uimsbf | template length |
| template | 8*N | uimsbf | template |
| } | | | |

FIG. 20

| Syntax | Num of bits | Mnemonic | Description |
|---|---|---|---|
| signaling_over_internet_descriptor{ | | | |
| descriptor_tag | 8 | uimsbf | descriptor tag |
| descriptor_length | 8 | uimsbf | descriptor length |
| uri_length | 16 | uimsbf | uri length of SLS signaling over internet |
| SLS_uri | 8*N | | uri of SLS signaling over internet |
| } | | | |

FIG. 21

| Syntax | Num of bits | Mnemonic | Description |
|---|---|---|---|
| FIT( | | | |
| FIT_protocol_version | 8 | uimsbf | Protocol version |
| Broadcast_stream_id | 16 | uimsbf | Broadcast Stream ID |
| num_services | 8 | uimsbf | Number of services |
| num_total_class | 4 | uimsbf | Number of total class |
| reserved | 4 | bslbf | |
| class_id | 4 | bslbf | class_id |
| version | 8 | bslbf | FIT version |
| for(j=0; j<num_services; j++) { | | | |
|   service_id | 16 | | Service ID |
|   provider_id | 16 | | Provider ID |
|   service_category | 5 | | Service category(liner TV, NRT, ESG, audio, etc.) |
|   sp_indicator | 1 | | Service protection |
|   SLS_simpleservice | 1 | | Broadcast simple service or not |
|   reserved | 1 | | |
|   num_srv_level_descriptor | 4 | | number of service level descriptor |
|   for (j=0; j<num_srv_level_descriptor; j++) { | | | |
|     srv_level_descriptor () | | | |
|   } | | | |
|   reserved | 4 | | |
| } | | | |
| num_FIT_level_descriptor | 4 | | number of FIT level descriptor |
| for(j=0; j<num_FIT_level_descriptor; j++) { | | | |
|   FIT_level_descriptor () | | | |
| } | | | |
| reserved | 4 | | |
| } | | | |

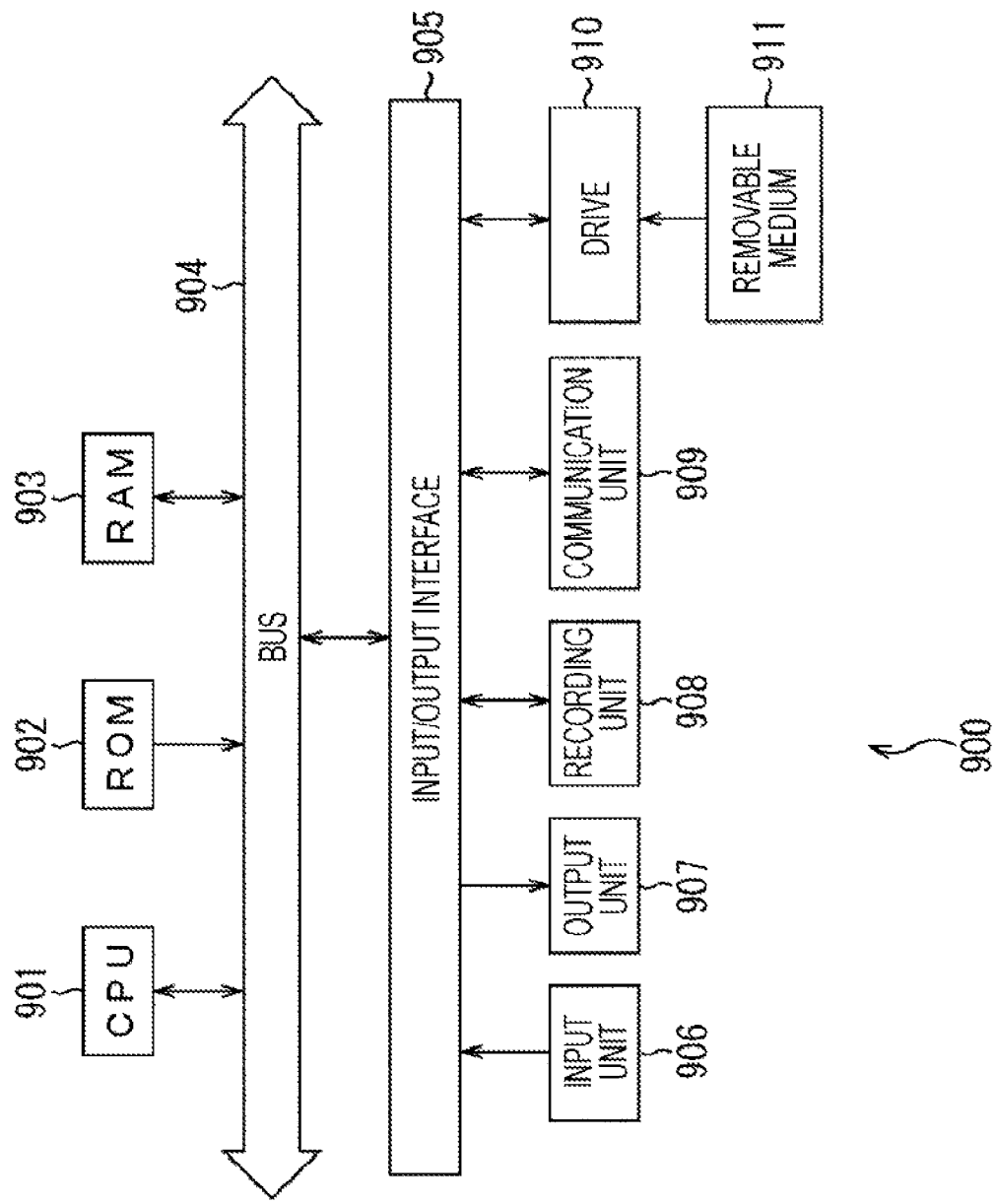

TRANSMISSION DEVICE, TRANSMISSION METHOD, RECEPTION DEVICE, AND RECEPTION METHOD

CROSS REFERENCE TO RELATED APPLICATIONS

This application is a Continuation of U.S. application Ser. No. 15/301,547, filed Oct. 3, 2016, which is a National Phase entry under 35 U.S.C. § 371 of International Application No. PCT/JP2016/052583, filed Jan. 29, 2016, which claims priority benefit of Japanese Patent Application No. JP 2015-042752 filed in the Japan Patent Office on Mar. 4, 2015 and Japanese Patent Application No. JP 2015-024779 filed in the Japan Patent Office on Feb. 10, 2015. Each of the above-referenced applications is hereby incorporated herein by reference in its entirety.

TECHNICAL FIELD

The present technology relates to a transmission device, a transmission method, a reception device, and a reception method and specifically relates to a transmission device, a transmission method, a reception device, and a reception method with each of which it becomes possible to perform transmission of control information according to an operation form.

BACKGROUND ART

In countries including Japan and the US, a service of digital television broadcasting has been started (see, for example, Patent Document 1). Also, by a digital television broadcasting standard, various kinds of control information are prescribed to realize a service of the digital television broadcasting.

CITATION LIST

Patent Document

Patent Document 1: Japanese Patent Application Laid-Open No. 2008-263616

SUMMARY OF THE INVENTION

Problems to be Solved by the Invention

Incidentally, this kind of control information includes information to be immediately acquired on a side of a reception device or information that is not necessarily acquired immediately depending on contents thereof. It is desired to make it possible to perform transmission of control information according to an operation form.

Also, it is desired to transmit this kind of control information as one management table among a plurality of service providers. In addition, it is desired to manage this kind of control information for each service provider independently and to transmit the control information according to each operation form.

The present technology is provided in view of the forgoing condition and is to make it possible to perform transmission of control information according to an operation form.

Solutions to Problems

A transmission device of a first aspect of the present technology is a transmission device including: a generation unit configured to generate first data including control information, which includes information necessary for channel selection of a service, and transmission sequence information indicating a sequence in which the control information is transmitted; and a transmission unit configured to transmit the first data in a transmission sequence corresponding to the transmission sequence information along with second data including data of a component included in the service.

The transmission device of the first aspect of the present technology may be an independent device or an internal block included in one device. Also, a transmission method of the first aspect of the present technology is a transmission method corresponding to the above-described transmission device of the first aspect of the present technology.

In the transmission device and the transmission method of the first aspect of the present technology, first data including control information, which includes information necessary for channel selection of a service, and transmission sequence information indicating a sequence in which the control information is transmitted is generated, and the first data is transmitted in a transmission sequence corresponding to the transmission sequence information along with second data including data of a component included in the service.

A reception device of a second aspect of the present technology is a reception device including: a reception unit configured to receive first data that includes control information, which includes information necessary for channel selection of a service, and transmission sequence information indicating a sequence in which the control information is transmitted and that is transmitted in a transmission sequence corresponding to the transmission sequence information; and a control unit configured to control processing on second data including data of a component included in the service on the basis of the control information acquired according to the transmission sequence information.

The reception device of the second aspect of the present technology may be an independent device or an internal block included in one device. Also, a reception method of the second aspect of the present technology is a reception method corresponding to the above-described reception device of the second aspect of the present technology.

In the reception device and the reception method of the second aspect of the present technology, first data that includes control information, which includes information necessary for channel selection of a service, and transmission sequence information indicating a sequence in which the control information is transmitted and that is transmitted in a transmission sequence corresponding to the transmission sequence information is received, and processing on second data including data of a component included in the service on the basis of the control information acquired according to the transmission sequence information is controlled.

Effects of the Invention

According to the first aspect and the second aspect of the present technology, it is possible to perform transmission of control information according to an operation form.

Note that an effect described herein is not the limitation and may be any of the effects disclosed in the present disclosure.

BRIEF DESCRIPTION OF DRAWINGS

FIG. 14 is a view illustrating an example of syntax of the FIT.

FIG. 15 is a view illustrating an example of syntax of a service status descriptor.

FIG. 16 is a view illustrating an example of syntax of a service name descriptor.

FIG. 17 is a view illustrating an example of syntax of a capability descriptor.

FIG. 18 is a view illustrating an example of syntax of a service bootstrap descriptor.

FIG. 19 is a view illustrating an example of syntax of a signaling template descriptor.

FIG. 20 is a view illustrating an example of syntax of a signaling over Internet descriptor.

FIG. 21 is a view illustrating a different example of syntax of the FIT.

FIG. 29 is a view illustrating a configuration example of a computer.

MODE FOR CARRYING OUT THE INVENTION

Figure 1:
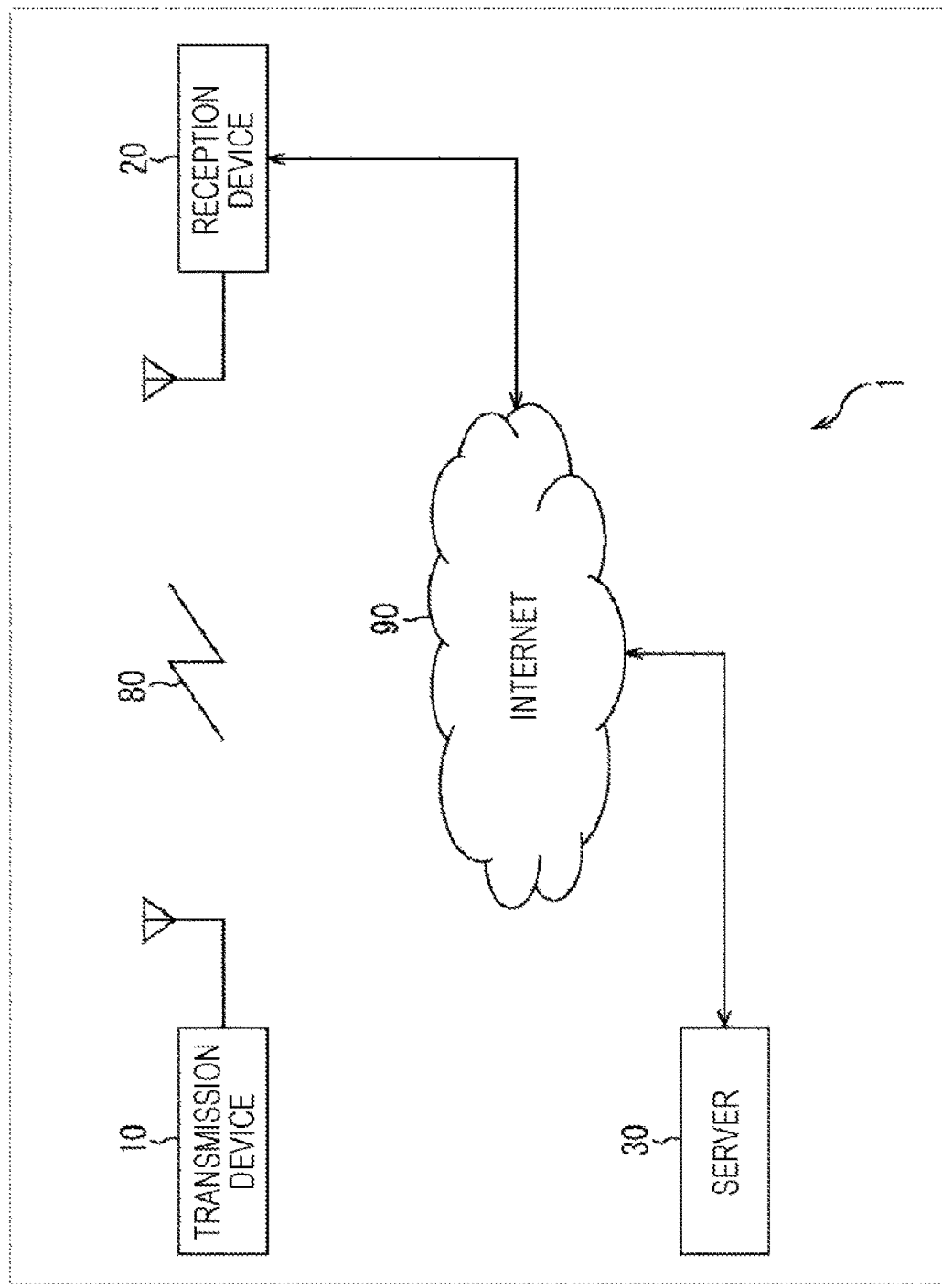
FIG. 1 is a view illustrating a configuration of an embodiment of a transmission system to which the present technology is applied.

In the following, an embodiment of the present technology will be described with reference to the drawings. Note that the description will be made in the following order.

1. Configuration of system
2. Method of transmitting class information and version information
3. Operation example
   (1) First operation example: L1 frame transmission system
   (2) Second operation example: L2 packet transmission system
   (3) Third operation example: transmission of FIT by utilization of provider ID
4. Example of syntax
5. Configuration of each device
6. Flow of processing executed in each device
7. Modification example
8. Configuration of computer <1. Configuration of System>

(Configuration Example of Transmission System)

In FIG. 1, a transmission system 1 is a system of providing a service of digital television broadcasting (digital broadcasting). The transmission system 1 includes a transmission device 10, a reception device 20, and a server 30. Also, in FIG. 1, the reception device 20 and the server 30 are connected to each other through the Internet 90.

The transmission device 10 is a transmitter corresponding to a predetermined standard of digital broadcasting and is provided by a broadcasting provider (service provider). Note that in an embodiment of the present technology, a standard such as advanced television systems committee standards (ATSC) can be employed as a standard of digital broadcasting.

The transmission device 10 transmits a stream of a component such as a video, audio, or a subtitle included in a service by an airwave of digital broadcasting through a transmission path 80 along with signaling data. Here, the service is, for example, an organized program (television program) produced by a broadcasting provider (service provider). Also, the signaling data is control information necessary for viewing the service.

The reception device 20 is a receiver corresponding to a predetermined standard of digital broadcasting such as ATSC and is a fixed receiver such as a television receiver or a set-top box or a mobile receiver such as a smartphone, a mobile phone, a tablet-type computer, a notebook-type personal computer, or a terminal used in a vehicle.

The reception device 20 receives, through the transmission path 80, the airwave of the digital broadcasting transmitted from the transmission device 10 and acquires signaling data transmitted by the airwave of the digital broadcasting. Based on the signaling data, the reception device 20 is connected to a stream of (component included in) a service transmitted by the airwave of the digital broadcasting transmitted from the transmission device 10 and reproduces (output) an image and sound acquired from the stream.

The server 30 performs streaming delivery of a stream of a component such as a video, audio, or a subtitle included in the service through the Internet 90 according to a request from the reception device 20. Also, the server 30 delivers the signaling data through the Internet 90 according to a request from the reception device 20. Note that the server 30 may provide non real time (NRT) content such as electronic service guide (ESG) metadata or an application in addition to the signaling data (SLS signaling data described later).

The reception device 20 includes a communication function and can access the server 30 through the Internet 90. Based on signaling data from the transmission device 10 or the server 30, the reception device 20 is connected to a stream of (component included in) a service, streaming delivery of which is performed by the server 30 through the Internet 90, and reproduces (output) an image and sound acquired from the stream.

Note that in FIG. 1, a configuration in which the airwave of the digital broadcasting from the transmission device 10 is directly received by the reception device 20 is illustrated. However, an airwave of digital broadcasting may be transmitted through one or a plurality of relay stations (not illustrated). Also, in a case of being a mobile receiver, the reception device 20 is connected to the Internet 90 through an access point of a public wireless local area network (LAN) or to the server 30 through a mobile network (not illustrated) such as long term evolution (LTE).

Also, there is a case where the reception device 20 does not include a communication function or a case where a communication function is included but the communication function is invalid. In that case, the reception device 20 cannot access the server 30. Also, in FIG. 1, for simplification of a description, a case where the server 30 delivers both of a stream of a component such as a video or audio and signaling data is illustrated. However, a stream of a component and signaling data may be delivered from different servers.

<2. Method of Transmitting Class Information and Version Information>

As signaling data, there are low layer signaling (LLS) signaling data in a low layer which data does not depend on a service and service layer signaling (SLS) signaling data in a unit of a service. Here, when an IP transmission system using an Internet protocol (IP) packet is employed as a standard of digital broadcasting, the LLS signaling data is transmitted in a layer lower than an IP layer and the SLS signaling data is transmitted in a layer higher than the IP layer in a protocol stack of the IP transmission system. However, when being transmitted, the LLS signaling data may be packetized by the IP layer for commonization with transmission of the SLS signaling data and data.

Note that in ATSC 3.0 that is a next-generation broadcasting standard in the US and that is currently developed, employment of digital broadcasting using an IP transmission system is expected.

The LLS signaling data may include a fast information table (FIT) in addition to metadata such as emergency alerting description (EAD), region rating description (RRD), and default component description (DCD). That is, there is a case where the FIT is transmitted in a first layer (physical layer) other than a case where the FIT is transmitted as the LLS signaling data.

The FIT includes, for example, information indicating a configuration of a stream or a service in a broadcasting network in an ID system corresponding to a moving picture experts group phase 2-transport stream (MPEG2-TS) system. Also, in the FIT, a service status descriptor, a service name descriptor, a capability descriptor, a service bootstrap descriptor, a signaling template descriptor, a signaling over Internet descriptor, or the like is arranged as a descriptor of a service level.

The service status descriptor describes a state of a service. The service name descriptor describes a name of a service. The capability descriptor describes a capability of the reception device 20. The service bootstrap descriptor describes bootstrap information for acquisition of SLS signaling data. The signaling template descriptor describes a template of signaling data. The signaling over Internet descriptor describes information related to SLS signaling data delivered from the server 30.

In the FIT, a class (sequence) is defined. The class (sequence) is used in a case where the FIT is transmitted in a plurality of different cycles. Also, the class (sequence) is used in a case where the FIT is transmitted by a plurality of different service providers. The class includes a delivery class ID (delivery_group_id) and a provider ID (provider_id). The plurality of different cycles is identified by delivery class IDs and the plurality of different service providers is identified by provider IDs. The class (sequence) is identified by a class ID. That is, identification is performed with the delivery class ID and the provider ID. Also, a version of a FIT in each class (sequence) is managed with version information. In the following description, the class ID and the number of classes are collectively referred to as "class information." Also, the class information and the version information are collectively referred to as "transmission sequence information."

The SLS signaling data includes metadata such as a user service bundle description (USBD), a user service description (USD), a session description protocol (SDP), a media presentation description (MPD), an initialization segment (IS), an LCT session instance description (LSID), and a service parameter description (SPD). However, metadata to be actually used among these kinds of metadata is determined according to operation.

Here, the SLS signaling data is transmitted by a real-time object delivery over unidirectional transport (ROUTE) session. ROUTE is file delivery over unidirectional transport (FLUTE) extended for a live service of broadcasting. Here, there is a case where a different name such as FLUTE+ (FLUTE plus) or FLUTE enhancement is used to refer to ROUTE. Note that a stream of a component such as a video, audio, or a subtitle included in a service can be also transmitted by the ROUTE session.

Note that in the following description, in a case where it is not necessary to distinguish the LLS signaling data and the SLS signaling data, the data is simply referred to as "signaling data."

(L1 Frame Transmission System)

Figure 2:
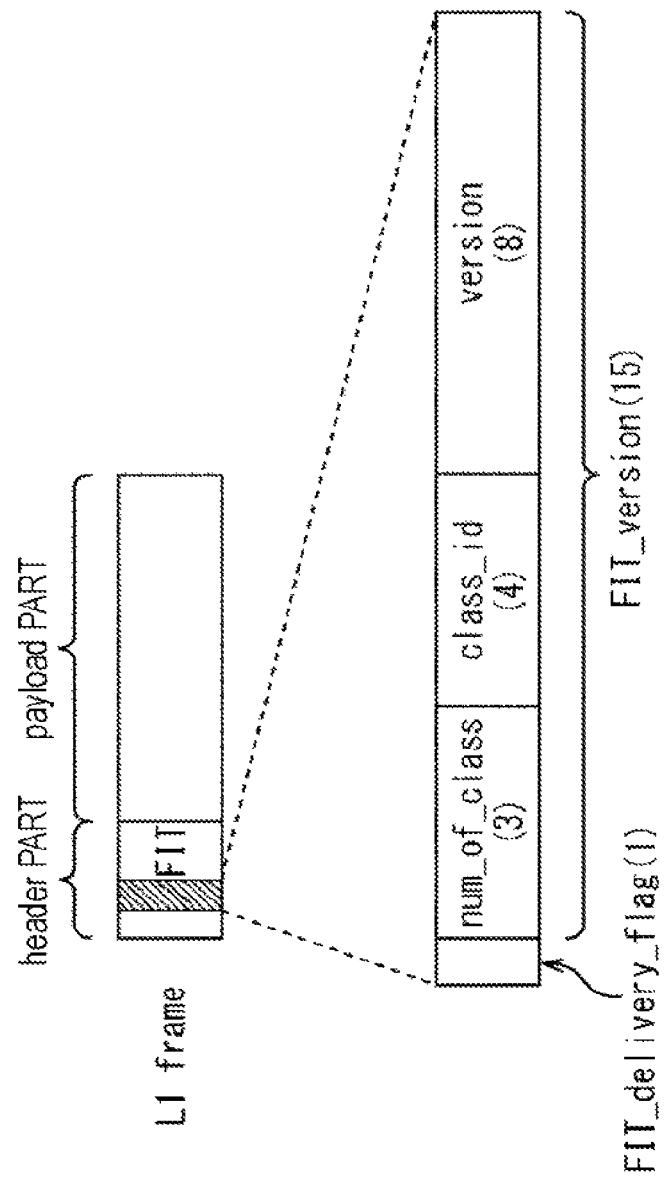
FIG. 2 is a view for describing an L1 frame transmission system.

FIG. 2 is a view for describing, as an L1 frame transmission system, transmission of transmission sequence information by utilization of a header part of an L1 frame.

The L1 frame is a frame in a first layer (physical layer) and includes a header part and a payload part. In the payload part of the L1 frame, a plurality of L2 packets (packet in second layer) is arranged and encapsulated.

In the header part, a FIT transmission flag (FIT_delivery_flag) having one bit and FIT version information (FIT_version) having 15 bits are arranged in addition of a FIT.

The FIT transmission flag is a flag indicating whether a FIT is transmitted. For example, when the FIT transmission flag is "TRUE," it is indicated that the FIT is transmitted. When the FIT transmission flag is "FALSE," it is indicated that the FIT is not transmitted.

The FIT version information includes the number of classes (num_of_class) having three bits, a class ID (class_id) having four bits, and version information (version) having eight bits. In other words, the FIT version information includes transmission sequence information. The number of classes indicates the number of classes (sequence) of a transmitted FIT. The class ID is an ID for identification of a class (sequence) of a FIT. The version information indicates a version of a FIT in each class (sequence).

In such a manner, in the L1 frame transmission system, a FIT transmission flag and FIT version information are arranged in the header part of the L1 frame. Thus, when acquiring the L1 frame, the reception device 20 determines whether a FIT is transmitted according to the FIT transmission flag. When the FIT is transmitted, it is possible to recognize a class (sequence) to which the FIT belongs and a version thereof on the basis of the class information and the version information (transmission sequence information). Accordingly, the reception device 20 can refer to the transmission sequence information in the header part of the L1 frame and can determine whether to acquire (extract) the FIT arranged in the header part and to perform processing.

Also, in a case where a plurality of service providers uses one broadcast stream, it is possible to describe a value of a provider ID in a class ID of each service provider. The reception device 20 can efficiently acquire only an intended FIT by performing filtering with the provider ID.

(Derivation Example of L1 Frame Transmission System)

Figure 3:
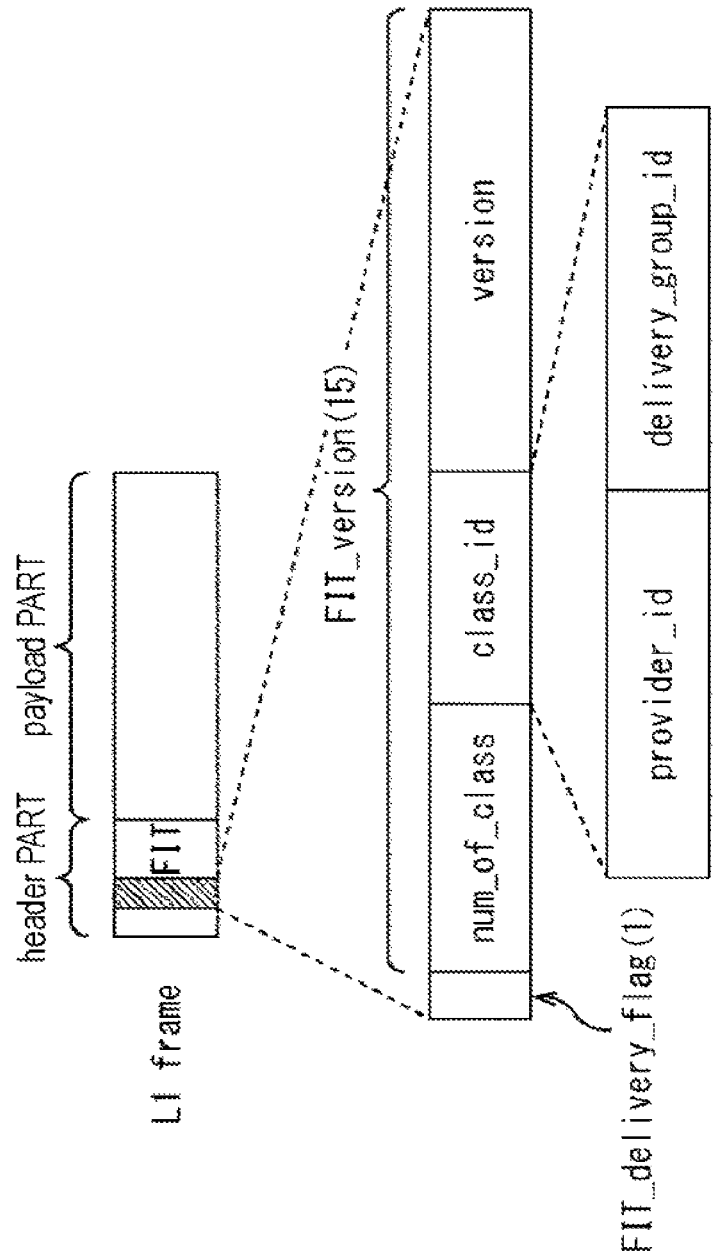
FIG. 3 is a view for describing a derivation example of the L1 frame transmission system.

FIG. 3 is a view for describing a derivation example of the L1 frame transmission system.

FIG. 3 is similar to the configuration in FIG. 2 in a point that FIT version information having 15 bits is arranged in a header part of an L1 frame and that the FIT version information includes the number of classes, a class ID, and version information. However, in the FIT version information in FIG. 3, the class ID includes a provider ID (provider_id) and a delivery class ID (delivery_group_id).

The provider ID is an ID for identification of a plurality of different service providers. The delivery class ID is an ID for identification of a transmission sequence with a difference in a time sequence of a FIT. That is, the class ID includes information for identification of a plurality of service providers and a plurality of transmission sequences with different time sequences. In such a manner, an ID for identification of a service provider that is a providing source of the FIT and information for identification of a transmission cycle of the FIT are provided by a class.

Note that one service provider and one transmission sequence with a difference in a time sequence may be included depending on operation. Here, the class ID is an ID for identification of a plurality of service providers and a plurality of transmission sequences with differences in a time sequence. However, depending on operation, a different transmission sequence may be indicated. For example, the class ID may be an ID indicating a capability of the reception device 20 which capability is necessary for reception of a service. Note that a size of each element (number of bit) is an example of operation and an actual size is determined according to operation.

(First L2 Packet Transmission System)

Figure 4:
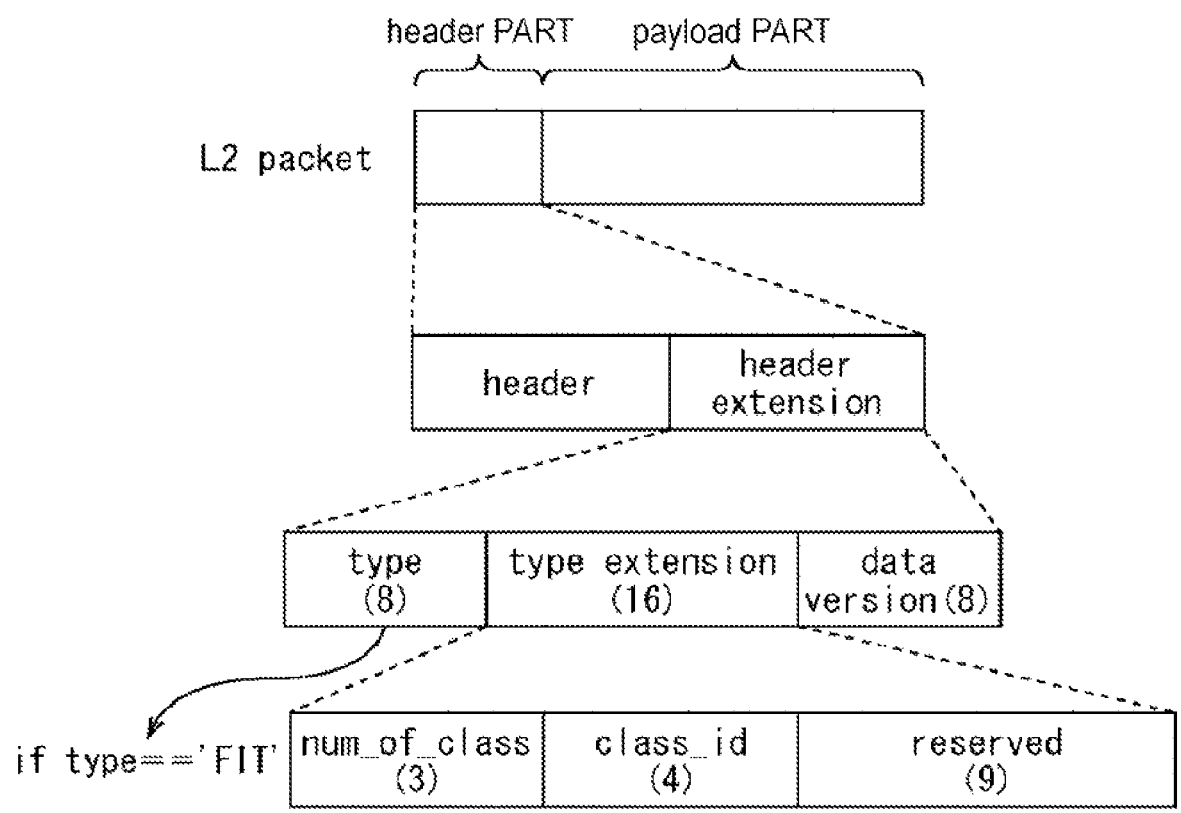
FIG. 4 is a view for describing a first L2 packet transmission system.

FIG. 4 is a view for describing, as a first L2 packet transmission system, transmission of transmission sequence information by utilization of an extension header in a header part of an L2 packet.

The L2 packet is a packet in a second layer and includes a header part and a payload part. Here, for example, in a case where an IP transmission system is employed as a standard of digital broadcasting, in a payload of the L2 packet, one or a plurality of IP packets are arranged and encapsulated. As data of the IP packet, for example, signaling data or the like is arranged in addition to data of a video or audio.

In an extension header (header extension) in the header part of the L2 packet, type information (type) having eight bits, extension-type information (type extension) having 16 bits, and data version information (data version) having eight bits are arranged.

The type information indicates a type of signaling data transmitted by the L2 packet. In a case where a FIT is arranged in the payload part of the L2 packet, a bit string indicating "FIT" is set in the type information.

The extension-type information includes the number of classes (num_of_class) having three bits and a class ID (class_id) having four bits. The number of classes indicates the number of classes (sequence) of a transmitted FIT. The class ID is an ID for identification of a class (sequence) of a FIT. Note that in the extension-type information, a reserved region (reserved) having nine bits is provided.

The data version information is version information indicating a version of each class (sequence) of a FIT.

In such a manner, in the first L2 packet transmission system, in the extension header of the header part of the L2 packet, type information, class information, and data version information are arranged. Thus, when acquiring the L2 packet, the reception device 20 determines whether a FIT is transmitted according to the type information. When the FIT is transmitted, it is possible to recognize a class (sequence) to which the FIT belongs and a version thereof on the basis of the class information and the version information (transmission sequence information). Accordingly, the reception device 20 can refer to the transmission sequence information in the extension header of the header part of the L2 packet and can determine whether to acquire (extract) the FIT arranged in a payload part thereof and to perform processing.

Also, in a case where a plurality of service providers uses one broadcast stream, it is possible to describe a value of a provider ID in a class ID of each service provider. The reception device 20 can efficiently acquire only an intended FIT by performing filtering with the provider ID.

(Derivation Example of First L2 Packet Transmission System)

Figure 5:
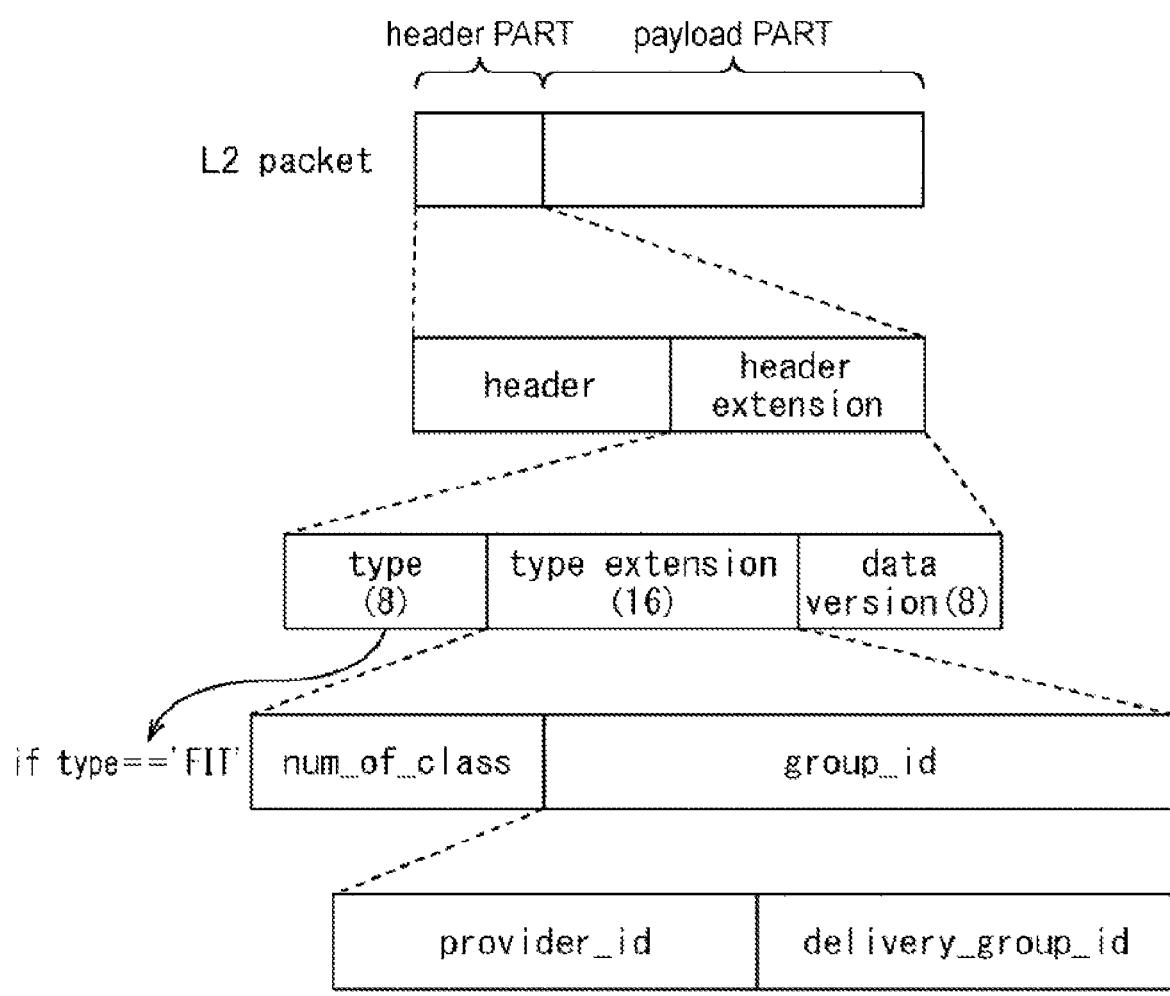
FIG. 5 is a view for describing a derivation example of the first L2 packet transmission system.

FIG. 5 is a view illustrating a derivation example of the first L2 packet transmission system.

FIG. 5 is similar to the configuration in FIG. 4 in a point that an extension header is arranged in a header part of an L2 packet and that the extension header includes type information, extension-type information, and data version information. However, in the extension-type information in FIG. 5, the number of groups (num_of_group) and a group ID (group_id) are arranged. Also, the group ID includes a provider ID (provider_id) and a delivery class ID (delivery_group_id).

The provider ID is an ID for identification of a plurality of different service providers. The delivery class ID is an ID for identification of a transmission sequence with a difference in a time sequence of a FIT. That is, the class ID includes information for identification of a plurality of service providers and a plurality of transmission sequences with different time sequences. In such a manner, an ID for identification of a service provider that is a providing source of the FIT and information for identification of a transmission cycle of the FIT are provided by a class.

Note that one service provider and one transmission sequence with a difference in a time sequence may be included depending on operation. Here, the class ID is an ID for identification of a plurality of service providers and a plurality of transmission sequences with differences in a time sequence. However, depending on operation, a different transmission sequence may be indicated. For example, the class ID may be an ID indicating a capability of the reception device 20 which capability is necessary for reception of a service. Note that a size of each element (number of bit) is an example of operation and an actual size is determined according to operation.

(Second L2 Packet Transmission System)

Figure 6:
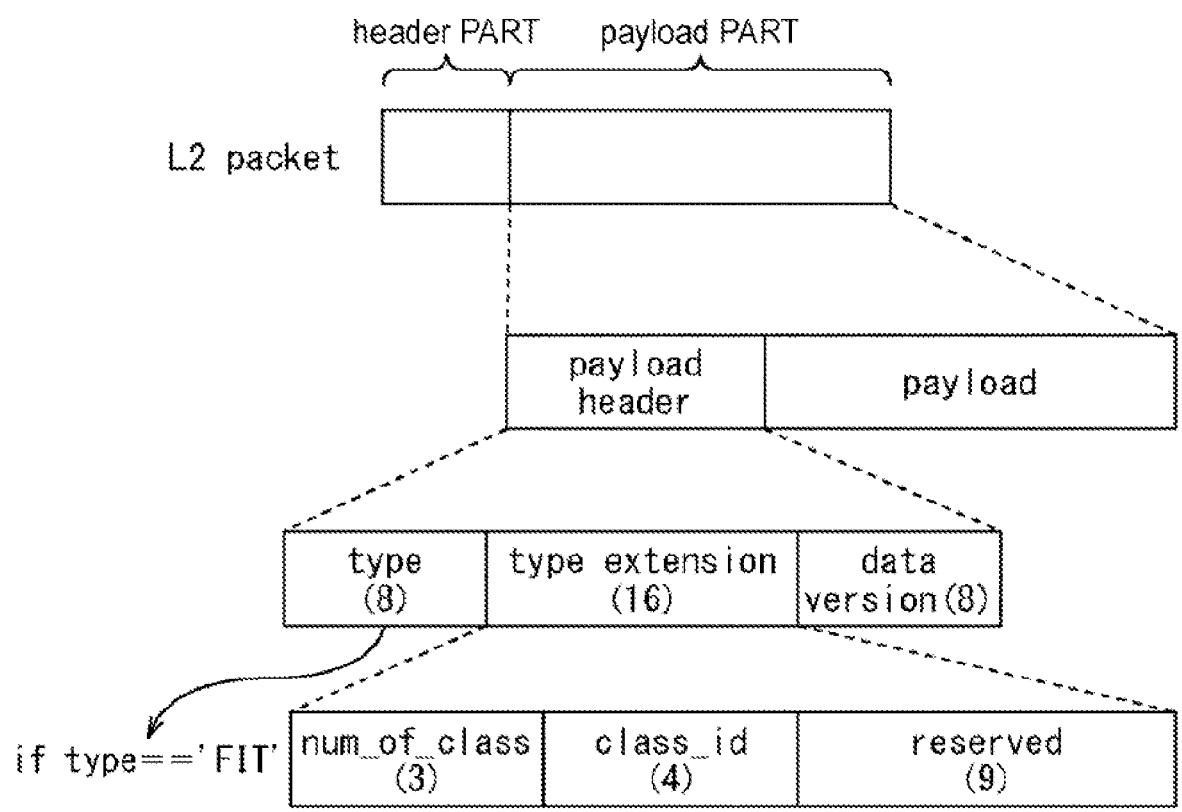
FIG. 6 is a view for describing a second L2 packet transmission system.

FIG. 6 is a view for describing, as a second L2 packet transmission system, transmission of transmission sequence information by utilization of a payload header in a payload part of an L2 packet.

The L2 packet includes a header part and a payload part.

In a payload header (payload header) in the payload part of the L2 packet, type information (type) having eight bits, extension-type information (type extension) having 16 bits, and data version information (data version) having eight bits are arranged.

The type information indicates a type of signaling data transmitted by the payload part of the L2 packet. In a case where a FIT is arranged in the payload part of the L2 packet, a bit string indicating "FIT" is set in the type information.

The extension-type information includes the number of classes (num_of_class) having three bits and a class ID (class_id) having four bits. The number of classes indicates the number of classes (sequence) of a transmitted FIT. The class ID is an ID for identification of a class (sequence) of a FIT. Note that in the extension-type information, a reserved region (reserved) having nine bits is provided.

The data version information is version information indicating a version of each class (sequence) of a FIT.

In such a manner, in the payload header in the payload part of the L2 packet in the second L2 packet transmission system, the type information, the class information, and the data version information are arranged. Thus, when acquiring the L2 packet, the reception device 20 determines whether a FIT is transmitted according to the type information. When the FIT is transmitted, it is possible to recognize a class (sequence) to which the FIT belongs and a version thereof on the basis of the class information and the version information (transmission sequence information). Accordingly, the reception device 20 can refer to the transmission sequence information in the payload header in the payload part of the L2 packet and can determine whether to acquire (extract) a FIT arranged in the payload part and to perform processing.

Also, in a case where a plurality of service providers uses one broadcast stream, it is possible to describe a value of a provider ID in a class ID of each service provider. The reception device 20 can efficiently acquire only an intended FIT by performing filtering with the provider ID.

(Derivation Example of Second L2 Packet Transmission System)

Figure 7:
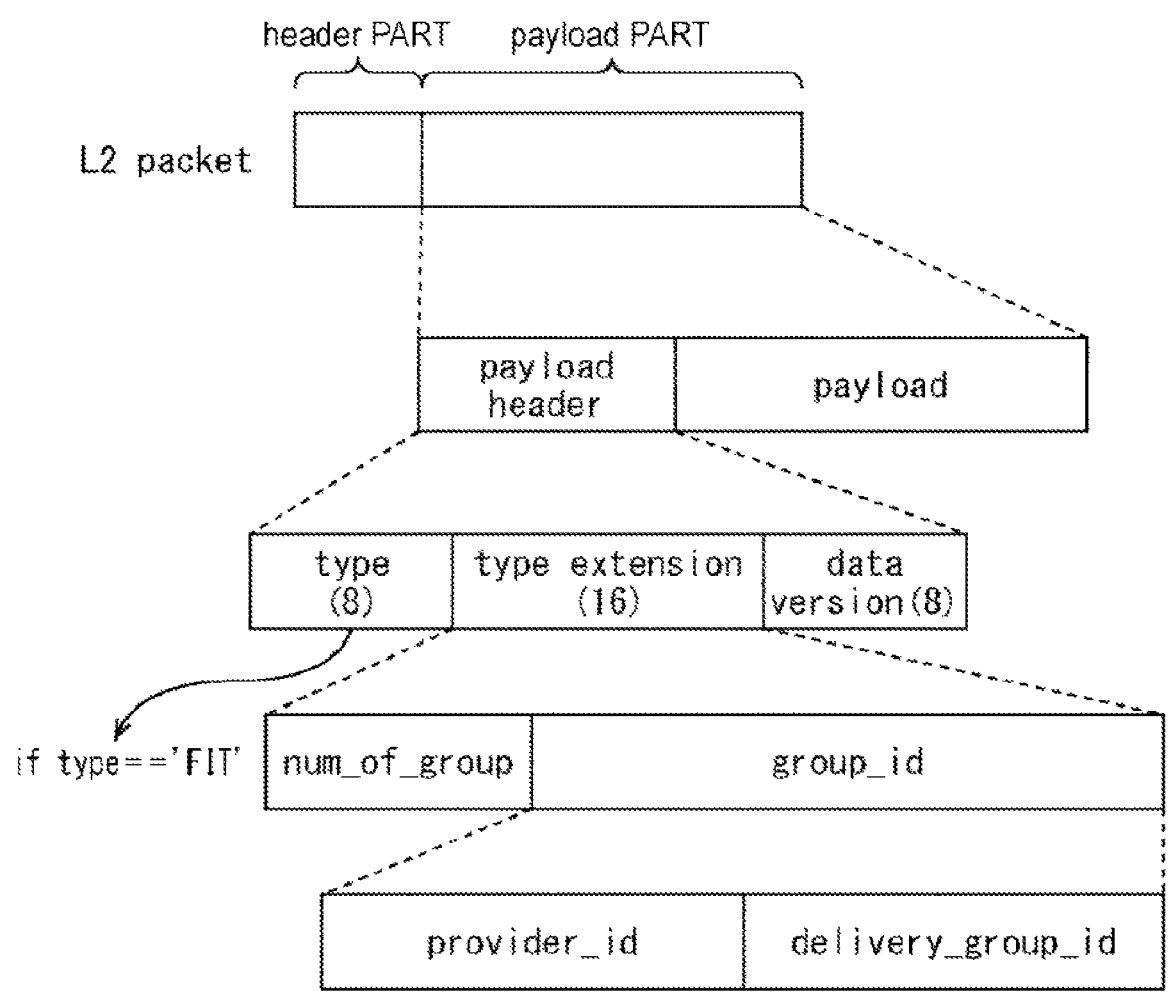
FIG. 7 is a view for describing a derivation example of the second L2 packet transmission system.

FIG. 7 is a view illustrating a derivation example of the second L2 packet transmission system.

FIG. 7 is similar to the configuration of FIG. 6 in a point that a payload header is arranged in a payload part of an L2 packet and that the payload header includes type information, extension-type information, and data version information. However, in the extension-type information in FIG. 7, the number of groups (num_of_group) and a group ID (group_id) are arranged. Also, the group ID includes a provider ID (provider_id) and a delivery class ID (delivery_group_id).

The provider ID is an ID for identification of a plurality of different service providers. The delivery class ID is an ID for identification of a transmission sequence with a difference in a time sequence of a FIT. That is, the class ID includes information for identification of a plurality of service providers and a plurality of transmission sequences with different time sequences. In such a manner, an ID for identification of a service provider that is a providing source of the FIT and information for identification of a transmission cycle of the FIT are provided by a class.

Note that one service provider and one transmission sequence with a difference in a time sequence may be included depending on operation. Here, the class ID is an ID for identification of a plurality of service providers and a plurality of transmission sequences with differences in a time sequence. However, depending on operation, a different transmission sequence may be indicated. For example, the class ID may be an ID indicating a capability of the reception device 20 which capability is necessary for reception of a service. Note that a size of each element (number of bit) is an example of operation and an actual size is determined according to operation.

<3. Operation Example>

Next, a detailed operation example of the L1 frame transmission system and the L2 packet transmission system will be described.

(1) First Operation Example

Figure 8:
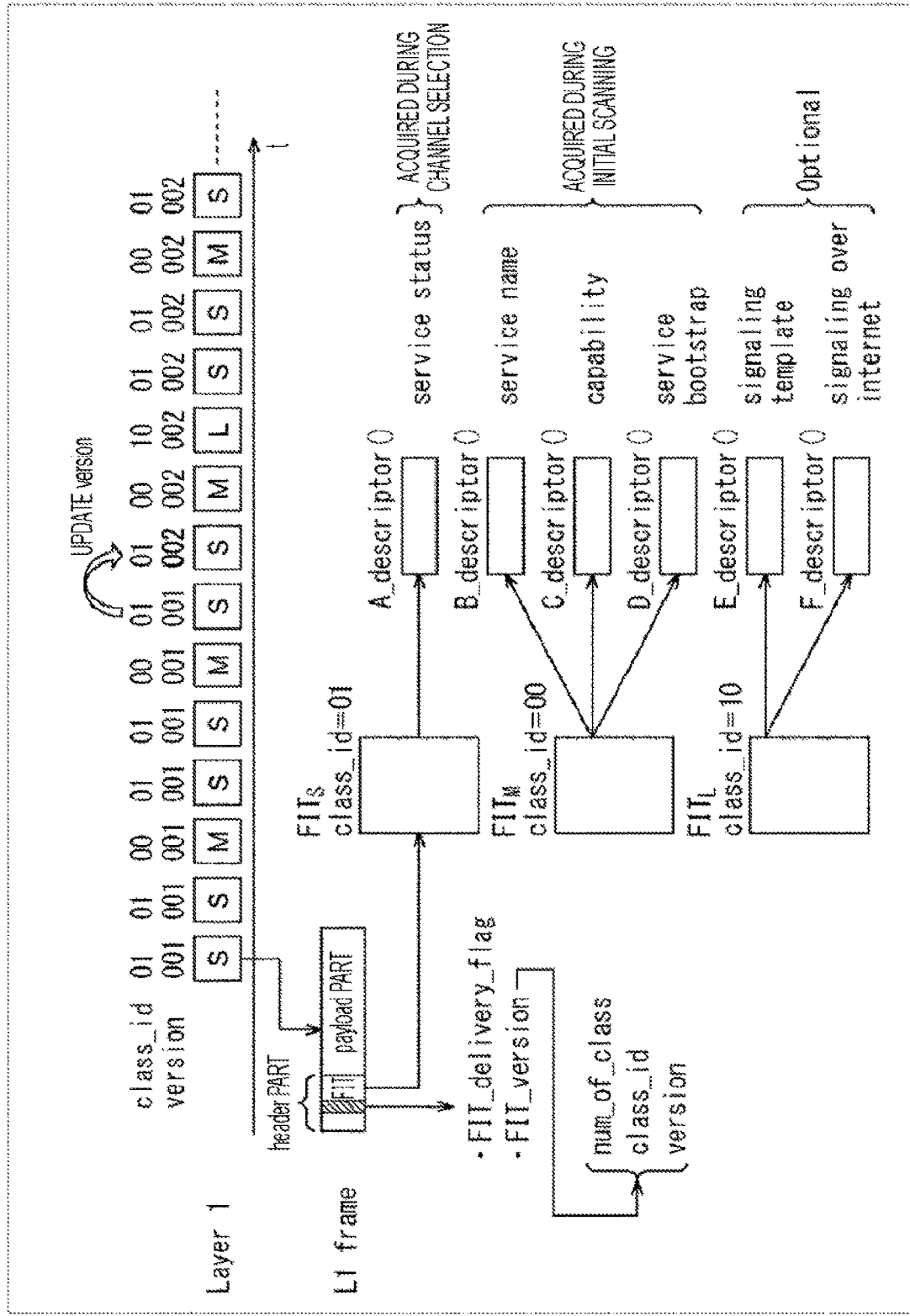
FIG. 8 is a view for describing a first operation example of using the L1 frame transmission system.

FIG. 8 is a view for describing a first operation example of using the L1 frame transmission system.

In FIG. 8, squares with "L," "M," and "S" in a first layer indicate L1 frames. In a header part of each L1 frame, a FIT is arranged. The square with "L (long)" indicates an L1 frame in which a FIT to be acquired (updated) on a side of the reception device 20 in a relatively long cycle such as a cycle of 10 seconds (hereinafter, also referred to as "$FIT_L$ in long cycle") is arranged.

Also, the square with "S (short)" indicates an L1 frame in which a FIT to be acquired (updated) on the side of the reception device 20 in a relatively short cycle such as a cycle of 100 milliseconds (hereinafter, also referred to as "$FIT_S$ in short cycle") is arranged. Moreover, the square with "M (middle)" indicates an L1 frame in which a FIT to be acquired (updated) in a cycle, which is between the cycle of "L" and the cycle of "S," such as a cycle of one second (hereinafter, referred to as "$FIT_M$ in middle cycle") is arranged.

Hereinafter, an L1 frame with "L" will be described as an "L1 frame L". Similarly, an L1 frame with "M" will be described as an "L1 frame M" and an L1 frame with "S" will be described as an "L1 frame S." Also, in FIG. 8, a direction of time is a direction from a left side to a right side in the drawing.

In FIG. 8, the L1 frame L is transmitted after transmission of the L1 frame S, the L1 frame S, and the L1 frame M is repeated three times. Then, similarly, processing of transmitting the L1 frame L after transmission of the L1 frame S twice and transmission of the L1 frame M once are repeated three times is repeatedly performed although not all of the processing is illustrated.

That is, when a group of ten L1 frames transmitted in a temporally continuous manner is focused, six L1 frames S in each of which the $FIT_S$ in a short cycle is arranged, three L1 frames M in each of which the $FIT_M$ in a middle cycle is arranged, and one L1 frame L in which the $FIT_L$ in a long cycle is arranged are transmitted.

In other words, the L1 frame L, the L1 frame M, and the L1 frame S are transmitted in different cycles. A transmission cycle of the L1 frame S is the shortest cycle, a transmission cycle of the L1 frame M is the second shortest cycle, and a transmission cycle of the L1 frame L is the longest cycle.

Here, the reception device 20 refers to a FIT transmission flag (FIT_delivery_flag) arranged in a header part of a focused current L1 frame (hereinafter, also referred to as "current L1 frame") and determines whether a FIT is transmitted in the current L1 frame. In the first operation example in FIG. 8, a FIT is transmitted in each L1 frame, "TRUE" is set in the FIT transmission flag.

Also, since class information and version information are included in FIT version information (FIT_version) arranged in the header part, the reception device 20 can recognize a class (sequence) to which a FIT transmitted in the current L1 frame belongs and a version thereof.

In FIG. 8, since three sequences of the L1 frame L, the L1 frame M, and the L1 frame S are transmitted, "3" is set in the number of classes (num_of_class). Thus, in FIG. 8, in FIT version information in a header part of each L1 frame, "3" is set as the number of classes (not illustrated). Also, as class IDs (class_id), "01" is set in the $FIT_S$ in a short cycle, "00" is set in the $FIT_M$ in a middle cycle, and "10" is set in the $FIT_L$ in a long cycle. Moreover, in the version information, a value incremented by one is set with respect to each class each time contents of a FIT are updated.

Here, when the L1 frame S is focused among L1 frames arrayed in a time sequence, in a case where ahead L1 frame S is a current L1 frame, a class ID of "01" and version information of "001" are set in FIT version information in a header part thereof. The reception device 20 refers to the class information and the version information and determines whether to acquire and record (update) a $FIT_S$ in a short cycle which FIT is transmitted in the head L1 frame S.

For example, in the reception device 20, when the $FIT_S$ in a short cycle is already acquired and "001" is set as version information thereof, the $FIT_S$ arranged in the header part of the head L1 frame S is ignored.

Note that in a case where the $FIT_S$ in a short cycle is not yet acquired or a case where the $FIT_S$ in a short cycle is already acquired but "000" is set as version information thereof, the reception device 20 acquires and records (update) the $FIT_S$ arranged in the header part of the head L1 frame S.

Then, in a case where the second L1 frame S from the head is a current L1 frame, a class ID of "01" and version information of "001" are set in FIT version information in a header part thereof. The reception device 20 recognizes that a $FIT_S$ in the same version is already acquired by referring to the class information and the version information. Thus, a $FIT_S$ arranged in the header part of the second L1 frame S is ignored.

Similarly, in a case where each of the fourth, fifth, and seventh L1 frames S from the head becomes a current L1 frame, the reception device 20 recognizes that a $FIT_S$ in the same version is already acquired by referring to class information and version information set in FIT version information in a header part thereof. Thus, a $FIT_S$ arranged in the header part of the current L1 frame is ignored.

Then, in a case where the eighth L1 frame S from the head becomes a current L1 frame, version information of "002" is set in FIT version information in a header part thereof and the version information of "001" in the seventh L1 frame S in which the $FIT_S$ is precedingly arranged is incremented. In this case, the reception device 20 recognizes that a version of the $FIT_S$ is different and acquires and records (update) a $FIT_S$ arranged in the header part in the eighth L1 frame S.

Then, when each of the eleventh, twelfth, fourteenth, and subsequent L1 frames S from the head becomes a current L1 frame, in a case where the reception device 20 recognizes that a $FIT_S$ in the same version is already acquired by referring to class information and version information in FIT version information in a header part thereof, a $FIT_S$ arranged in the header part of the current L1 frame is ignored. On the other hand, in a case where the reception device 20 recognizes that a $FIT_S$ in a different version is not yet acquired by referring to class information and version information set in FIT version information in the header part, the $FIT_S$ arranged in the header part of the current L1 frame is acquired and recorded (updated).

In such a manner, since being transmitted in a short cycle such as a cycle of 100 milliseconds compared to the $FIT_M$ in a middle cycle or the $FIT_L$ in a long cycle, the $FIT_S$ in a short cycle can be used for transmission of information to be immediately acquired (updated) by the reception device 20 (information with temporal limit). For example, as such information with a temporal limit, there is information to be dynamically updated according to a condition of a service of a selected channel (dynamic parameter).

In the $FIT_S$ in a short cycle, information with a temporal limit can be arranged as a service level descriptor such as an A_descriptor( ). For example, since a service status descriptor is arranged in the $FIT_S$, the reception device 20 can acquire (update) the $FIT_S$ promptly and can check a state of a service in a case where a version of the $FIT_S$ transmitted in a short cycle varies in channel selection of a service.

Here, when the L1 frame M is focused among L1 frames arrayed in a time sequence, in a case where the third L1 frame M from a head becomes a current L1 frame, a class ID of "00" and version information of "001" are set in FIT version information in a header part thereof. For example, in the reception device 20, when the $FIT_M$ in a middle cycle is already acquired and "001" is set as version information thereof, a $FIT_M$ arranged in the header part of the third L1 frame M is ignored.

Similarly, in a case where the sixth L1 frame M from the head becomes a current L1 frame, the reception device 20 recognizes that a $FIT_M$ in the same version is already acquired by referring to class information and version information in FIT version information in a header part thereof. Thus, a $FIT_M$ arranged in the header part of the sixth L1 frame M is ignored.

Then, in a case where the ninth L1 frame M from the head becomes a current L1 frame, version information of "002" is set in FIT version information in a header part thereof and the version information of "001" in the sixth L1 frame M in which the $FIT_M$ is precedingly arranged is incremented. In this case, the reception device 20 recognizes that a version of the $FIT_M$ is different and acquires and records (update) a $FIT_M$ arranged in the header part in the ninth L1 frame M.

Then, when each of the thirteenth and subsequent L1 frames M from the head becomes a current L1 frame, in a case where the reception device 20 recognizes that a $FIT_M$ in the same version is already acquired by referring to class information and version information set in FIT version information in a header part thereof, a $FIT_M$ arranged in the header part of the current L1 frame is ignored. On the other hand, when the reception device 20 recognizes that a $FIT_M$ in a different version is not yet acquired by referring to class information and version information set in FIT version information in the header part, a $FIT_M$ arranged in the header part of the current L1 frame is acquired and recorded (updated).

In such a manner, since being transmitted in a cycle, which is between those of the $FIT_S$ in a short cycle and the $FIT_L$ in a long cycle, such as a cycle of one second, the $FIT_M$ in a middle cycle can be used for transmission of information that is not necessarily acquired (updated) by the reception device 20 immediately but there is a problem when a period until acquisition becomes too long (information with temporal limit permitted for certain degree). For example, as such information with a temporal limit permitted for a certain degree, there is information to be acquired in initial scanning processing (initial scanning parameter) or the like.

In the $FIT_M$ in a middle cycle, information with a temporal limit permitted for a certain degree can be arranged as a service level descriptors such as a B_descriptor( ), a C_descriptor( ), and a D_descriptor( ). For example, a service name descriptor, a capability descriptor, a service bootstrap descriptor, and the like are arranged. The reception device 20 can acquire the $FIT_M$ in a middle cycle in initial scanning processing and can record information described in the service name descriptor, the capability descriptor, and the service bootstrap descriptor (initial scanning parameter) as channel selection information.

Also, when the L1 frame L is focused among L1 frames arrayed in a time sequence, in a case where the tenth L1 frame L from a head is a current L1 frame, a class ID of "10" and version information of "002" are set in FIT version information in a header part thereof. For example, in the reception device 20, version information in an L1 frame L in which a $FIT_L$ is precedingly arranged is "001," a value of a version is incremented. In this case, the reception device 20 recognizes that a version of the $FIT_L$ is different and acquires and records (update) a $FIT_L$ arranged in the header part in the tenth L1 frame L.

Then, when each of subsequent L1 frames L becomes a current L1 frame, in a case where the reception device 20 recognizes that a $FIT_L$ in the same version is already acquired by referring to class information and version information in FIT version information in a header part thereof, a $FIT_L$ arranged in the header part of the current L1 frame is ignored. On the other hand, in a case where the reception device 20 recognizes that a $FIT_L$ in a different version is not yet acquired by referring to class information and version information set in FIT version information in the header part, a $FIT_L$ arranged in the header part of the current L1 frame is acquired and recorded (updated).

In such a manner, since being transmitted in a long cycle such as a cycle of ten seconds compared to the $FIT_S$ in a short cycle and the $FIT_M$ in a middle cycle, the $FIT_L$ in a long cycle is used for transmission of information that is not necessarily acquired (updated) by the reception device 20 immediately (information with no temporal limit). For example, as such information with no temporal limit, there is information to be statically updated (static parameter).

In the $FIT_L$ in a long cycle, information with no temporal limit can be arranged as a service level descriptor such as an E_descriptor( ) and an F_descriptor( ). For example, a signaling template descriptor (signaling template), a signaling over Internet descriptor (signaling over internet), or the like is arranged. The reception device 20 can acquire the $FIT_L$ in a long cycle, which FIT is transmitted in a long cycle, at arbitrary timing and can record information described in the signaling template descriptor or the signaling over Internet descriptor.

As described, in the first operation example using the L1 frame transmission system, transmission sequence information (class information) is set in FIT version information arranged in a header part of an L1 frame and $FIT_S$ are classified into a plurality of sequences by each class. Thus, it is possible to transmit the $FIT_S$ in a plurality of transmission cycles. For example, a $FIT_S$ in a short cycle (such as cycle of 100 milliseconds), a $FIT_L$ in a long cycle (such as cycle of 10 seconds), and a $FIT_M$ in a middle cycle (such as cycle of one second) can be transmitted. Also, by varying a service level descriptor arranged in a FIT in each transmission cycle, for example, it is possible to transmit information with a temporal limit, information with no temporal limit, or the like at appropriate timing according to usage.

Accordingly, since it is possible to classify (set) a service level descriptor described in a FIT in each class (sequence) and to perform transmission in different transmission cycles, transmission of a FIT according to an operation form can be performed. As a result, it becomes possible to correspond to an operation form flexibly. Also, since $FIT_S$ are transmitted in a plurality of transmission cycles by each class, it is possible to realize reduction of a transmission band of the $FIT_S$.

(2) Second Operation Example

Figure 9:
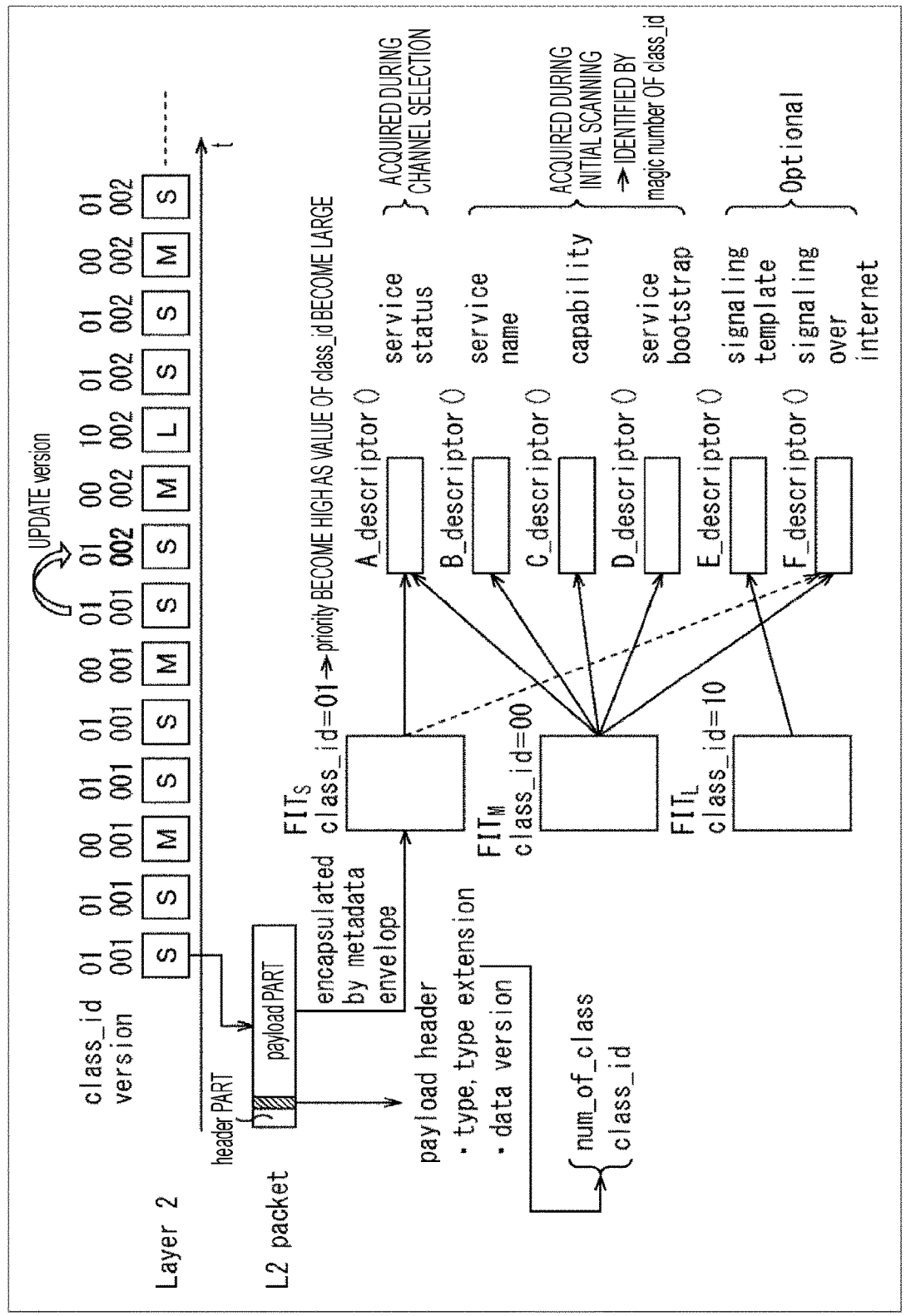
FIG. 9 is a view for describing a second operation example of using the L2 packet transmission system.

FIG. 9 is a view for describing a second operation example of using the L2 packet transmission system. Note that in the second operation example, a second L2 packet transmission system will be described as a representative.

In FIG. 9, squares with "L," "M," and "S" in a second layer indicate L2 packets and a meaning thereof is similar to that in the case of the L1 frame in FIG. 8. In FIG. 9, L2 packets with "L," "M," and "S" will be respectively described as an "L2 packet L," an "L2 packet M," and an "L2 packet S." That is, a $FIT_L$ in a long cycle such as a cycle of 10 seconds is arranged in the L2 packet L, a $FIT_M$ in a middle cycle such as a cycle of one second is arranged in the L2 packet M, and a $FIT_S$ in a short cycle such as a cycle of 100 milliseconds is arranged in the L2 packet S.

In FIG. 9, the L2 packet L is transmitted after transmission of the L2 packet S, the L2 packet S, and the L2 packet M is repeated three times. Then, similarly, processing of transmitting the L2 packet L after transmission of the L2 packet S twice and transmission of the L2 packet M once are repeated three times is repeatedly performed although not all of the processing is illustrated.

That is, when a group of ten L2 packets transmitted in a temporally continuous manner is focused, six L2 packet S in each of which the $FIT_S$ in a short cycle is arranged, three L2 packet M in each of which the $FIT_M$ in a middle cycle is arranged, and one L2 packet L in which the $FIT_L$ in a long cycle is arranged are transmitted.

Here, the reception device 20 refers to type information (type) arranged in a payload header in a payload part of a focused current L2 packet (hereinafter, also referred to as "current L2 packet") and determines whether a FIT is transmitted by the current L2 packet. In the second operation example in FIG. 9, since a FIT is transmitted in each L2 packet, a bit string indicating "FIT" is set in the type information.

Also, since class information is included in extension-type information arranged in the payload header and version information is included in data version information, the reception device 20 can recognize a class (sequence) to which a FIT transmitted in the current L2 packet belongs and a version thereof.

In FIG. 9, since three sequences of the L2 packet L, the L2 packet M, and the L2 packet S are transmitted, "3" is set in the number of classes (num_of_class) in a payload header in a payload part of each L2 packet (not illustrated). Also, in FIG. 9, similarly to FIG. 8, as class IDs (class_id), "01" is set in the $FIT_S$ in a short cycle, "00" is set in the $FIT_M$ in a middle cycle, and "10" is set in the $FIT_L$ in a long cycle. Moreover, in the version information, a value incremented by one is set with respect to each class each time contents of a FIT are updated.

Here, when the L2 packet S is focused among L2 packets arrayed in a time sequence, in a case where each of a head L2 packet S and the second, fourth, fifth, and seventh L2 packets S from the head becomes a current L2 packet, a class ID of "01" and version information of "001" are set in a payload header in a payload part thereof. The reception device 20 recognizes that a $FIT_S$ in the same version is already acquired by referring to class information and version information set in the payload header. Thus, a $FIT_S$ arranged in the payload part of the current L2 packet is ignored.

Then, when the eighth L2 packet S from the head becomes a current L2 packet, version information of "002" is set in a payload header in a payload part thereof and version information of "001" in the seventh L2 packet S in which the $FIT_S$ is precedingly arranged is incremented. In this case, the reception device 20 recognizes that a version of the $FIT_S$ is different and acquires and records (update) a $FIT_S$ arranged in the payload part of the eighth L2 packet S.

Then, in a case where each of the eleventh, twelfth, fourteenth, and subsequent L2 packets S from the head becomes a current L2 packet, when the reception device 20 recognizes that a $FIT_S$ in the same version is already acquired by referring to class information and version information set in a payload header in a payload part thereof, a $FIT_S$ arranged in the payload part of the L2 packet is ignored. On the other hand, when the reception device 20 recognizes that a $FIT_S$ in a different version is not yet acquired by referring to class information and version information in the payload header in the payload part, a $FIT_S$ arranged in the payload part in the current L2 packet is acquired and recorded (updated).

In such a manner, since being transmitted in a short cycle such as a cycle of 100 milliseconds compared to the $FIT_M$ in a middle cycle or the $FIT_L$ in a long cycle, the $FIT_S$ in a short cycle can be used for transmission of information to be immediately acquired (updated) by the reception device 20 (information with temporal limit). For example, as such information with a temporal limit, there is information to be dynamically updated according to a condition of a service of a selected channel (dynamic parameter).

In the $FIT_S$ in a short cycle, information with a temporal limit can be arranged as a service level descriptor such as an A_descriptor( ) or an F_descriptor( ). For example, since a service status descriptor is arranged in the $FIT_S$, the reception device 20 can acquire (update) the $FIT_S$ promptly and can check a state of a service in a case where a version of the $FIT_S$ transmitted in a short cycle varies in channel selection of a service.

Also, when the L2 packet M is focused among L2 packets arrayed in a time sequence, in a case where each of the third and sixth L2 packets M from the head becomes a current L2 packet, a class ID of "00" and version information of "001" are set in a payload header in a payload part thereof. The reception device 20 recognizes that a $FIT_M$ in the same version is already acquired by referring to class information and version information set in the payload header. Thus, a $FIT_M$ arranged in the payload part of the current L2 packet is ignored.

Then, when the ninth L2 packet M from the head becomes a current L2 packet, version information of "002" is set in a payload header in a payload part thereof and the version information of "001" in the sixth L2 packet M in which the $FIT_M$ is precedingly arranged is incremented. In this case, the reception device 20 recognizes that a version of the $FIT_M$ is different and acquires and records (update) a $FIT_M$ arranged in the payload part of the ninth L2 packet M.

Then, when each of the thirteenth and subsequent L2 packets M from the head becomes a current L2 packet, in a case where the reception device 20 recognizes that a $FIT_M$ in the same version is already acquired by referring to class information and version information set in a payload header in a payload part thereof, a $FIT_M$ arranged in the payload part of the current L2 packet is ignored. On the other hand, in a case where the reception device 20 recognizes that a $FIT_M$ in a different version is not yet acquired by referring to class information and version information set in the payload header in the payload part, a $FIT_M$ arranged in the payload part in the current L2 packet M is acquired and recorded (updated).

In such a manner, since being transmitted in a cycle, which is between those of the $FIT_S$ in a short cycle and the $FIT_L$ in a long cycle, such as a cycle of one second, the $FIT_M$ in a middle cycle can be used for transmission of information that is not necessarily acquired (updated) by the reception device 20 immediately but there is a problem when a period until acquisition becomes too long (information with temporal limit permitted for certain degree). For example, as such information with a temporal limit permitted for a certain degree, there is information to be acquired in initial scanning processing (initial scanning parameter) or the like.

In the $FIT_M$ in a middle cycle, information with a temporal limit permitted for a certain degree can be arranged as a service level descriptor such as an A_descriptor( ), a B_descriptor( ), a C_descriptor( ), a D_descriptor( ), or an F_descriptor( ). For example, a service name descriptor, a capability descriptor, a service bootstrap descriptor, and the like are arranged. The reception device 20 can acquire the $FIT_M$ in a middle cycle in initial scanning processing and can record information described in the service name descriptor, the capability descriptor, and the service bootstrap descriptor (initial scanning parameter) as channel selection information.

Note that when "00" that is a class ID of the $FIT_M$ in a middle cycle is set as a magic number, only a $FIT_M$ having a class ID of "00" needs to be acquired in initial scanning processing in the reception device 20. Thus, the reception device 20 can perform the initial scanning processing efficiently and promptly.

Also, when the L2 packet L is focused among L2 packets arrayed in a time sequence, in a case where the tenth L2 packet L from a head becomes a current L2 packet, a class ID of "10" and version information of "002" are set in a payload header in a payload part thereof. For example, in the reception device 20, when version information in an L2 packet L in which a $FIT_L$ is precedingly arranged is "001," a value of a version is incremented. In this case, the reception device 20 recognizes that a version of the $FIT_L$ is different and acquires and records (update) a $FIT_L$ arranged in the payload part of the tenth L2 packet L.

Then, when each of subsequent L2 packets L becomes a current L2 packet, in a case where the reception device 20 recognizes that a $FIT_L$ in the same version is already acquired by referring to class information and version information set in a payload header arranged in a payload part thereof, a $FIT_L$ arranged in the payload part of the current L2 packet is ignored. On the other hand, when the reception device 20 recognizes that a $FIT_L$ in a different version is not yet acquired by referring to class information and version information set in the payload header in the payload part, a $FIT_L$ arranged in the payload part in the current L2 packet L is acquired and recorded (updated).

In such a manner, since being transmitted in a long cycle such as a cycle of ten seconds compared to the $FIT_S$ in a short cycle and the $FIT_M$ in a middle cycle, the $FIT_L$ in a long cycle is used for transmission of information that is not necessarily acquired (updated) by the reception device 20 immediately (information with no temporal limit). For example, as such information with no temporal limit, there is information to be statically updated (static parameter).

In the $FIT_L$ in a long cycle, information with no temporal limit can be arranged as a service level descriptor such as an E_descriptor( ). For example, a signaling template descriptor or the like is arranged. The reception device 20 can acquire a $FIT_L$ in a long cycle, which FIT is transmitted in a long cycle, at arbitrary timing and can record information described in the signaling template descriptor.

Note that in the first operation example in FIG. 8, one or a plurality of service level descriptors is associated to each sequence of a FIT. For example, an A_descriptor( ) is arranged only in a $FIT_S$ in a short cycle and an F_descriptor( ) is arranged only in a $FIT_L$ in a long cycle. On the other hand, in a second operation example in FIG. 9, an A_descriptor( ) and an F_descriptor( ) are arranged in both of a $FIT_S$ in a short cycle and a $FIT_M$ in a middle cycle, that is, one or a plurality of service level descriptors is associated to a plurality of classes (sequence).

In a case of the first operation example (FIG. 8), since a service level descriptor is different for each class (sequence) of a FIT, it is possible to constantly refer to the latest service level descriptor when update (overwriting) processing with the latest service level descriptor is performed in the same class (sequence) of a FIT. On the other hand, in a case of the second operation example (FIG. 9), since a service level descriptor belongs to a plurality of classes (sequence), priority is given to each class (sequence) and a service level descriptor transmitted by a class (sequence) with low priority is updated (overwritten) with a service level descriptor transmitted by a class (sequence) with high priority.

For example, in a case where setting is performed in such a manner that priority becomes high as a value of a class ID becomes large, a $FIT_L$ in a long cycle with a class ID being "10" has the highest priority and priority becomes low in order of a $FIT_S$ in a short cycle with a class ID being "01" and a $FIT_M$ in a middle cycle with a class ID being "00." Thus, in the second operation example in FIG. 9, although the A_descriptor( ) and the F_descriptor( ) are arranged in both of the $FIT_S$ in a short cycle and the $FIT_M$ in a middle cycle, the A_descriptor( ) or the F_descriptor( ) arranged in the $FIT_M$ in a middle cycle can be updated (overwritten) with the A_descriptor( ) or the F_descriptor( ) arranged in the $FIT_S$ in a short cycle which FIT has higher priority than the $FIT_M$ in a middle cycle.

In such a manner, priority is given to each class (sequence), for example, with setting in such a manner that priority becomes high as a value of a class ID becomes large and overwriting processing corresponding to the priority is performed, whereby it is possible to reduce unnecessary repetition of the overwriting processing.

As described, in the second operation example using the second L2 packet transmission system, transmission sequence information (class information) is set in a payload header in a payload part of an L2 packet and $FIT_S$ are classified into a plurality of sequence by each class. Thus, it is possible to transmit the $FIT_S$ in a plurality of transmission cycles. For example, a $FIT_S$ in a short cycle (such as cycle of 100 milliseconds), a $FIT_L$ in a long cycle (such as cycle of 10 seconds), and a $FIT_M$ in a middle cycle (such as cycle of one second) can be transmitted. Also, by varying a service level descriptor arranged in a FIT in each transmission cycle, for example, it is possible to transmit information with a temporal limit, information with no temporal limit, or the like at appropriate timing according to usage.

Accordingly, since it is possible to classify (set) a service level descriptor described in a FIT in each class (sequence) and to perform transmission in different transmission cycles, transmission of a FIT according to an operation form can be performed. As a result, it becomes possible to correspond to an operation form flexibly. Also, since $FIT_S$ are transmitted in a plurality of transmission cycles by each class, it is possible to realize reduction of a transmission band of the $FIT_S$.

Note that in the second operation example, a case where transmission sequence information (class information and version information) is arranged in a payload header has been described as the second L2 packet transmission system. However, a case where the first L2 packet transmission system is used is in a similar manner except for a point that transmission sequence information is arranged in an extension header in a header part. Also, in each of the first operation example in FIG. 8 and the second operation example in FIG. 9, a class ID is expressed by a bit string having two bits and version information is expressed by a bit string having three bits in order to simplify the description.

(3) Third Operation Example
(First Transmission Form of Broadcast Service)

Figure 10:
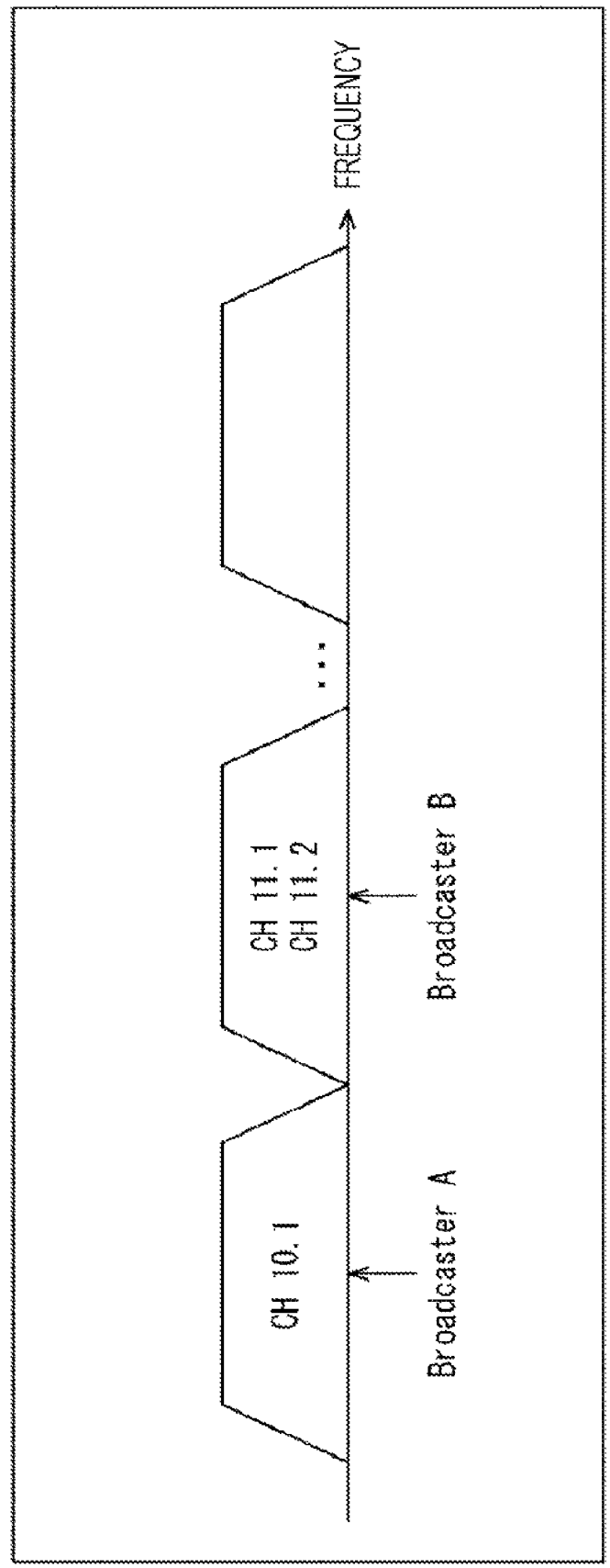
FIG. 10 is a view schematically illustrating a transmission form in a case where only one service provider uses one transmission band.

FIG. 10 is a view schematically illustrating a transmission form in a case where only one service provider uses one transmission band.

A frequency band assigned to a broadcast service is divided into predetermined frequency bands (such as 6 MHz band) and is managed with a physical channel number assigned by an authority or the like that manages a radio frequency. In FIG. 10, assignment is performed in such a manner that a first physical channel is occupied by a broadcasting station A (broadcaster A) and a second physical channel is occupied by a broadcasting station B (broadcaster B). The broadcasting station A assigns 10.1 to a channel and provides a service. On the other hand, the broadcasting station B assigns 11.1 and 11.2 to channels and provides a service.

Here, each of "10" and "11" indicates a major channel number assigned to each service provider and a number following the major channel number and a decimal point indicates a minor channel number. The major channel number is a number for identification of a service provider in a service region and the minor channel number is a number for identification of a channel of each service provider.

The service provider can provide one or a plurality of channels. In an example in FIG. 10, the broadcasting station A broadcasts one channel (10.1) and the broadcasting station B broadcasts two channels (11.1 and 11.2).

In a transmission form of a broadcast service in FIG. 10, since one transmission band is used by only one service provider, configuration information of a service provided by the one service provider is described in a FIT transmitted by the transmission band. That is, the service provider independently creates (generate), manages, and operates a FIT.

(Second Transmission Form of Broadcast Service)

Figure 11:
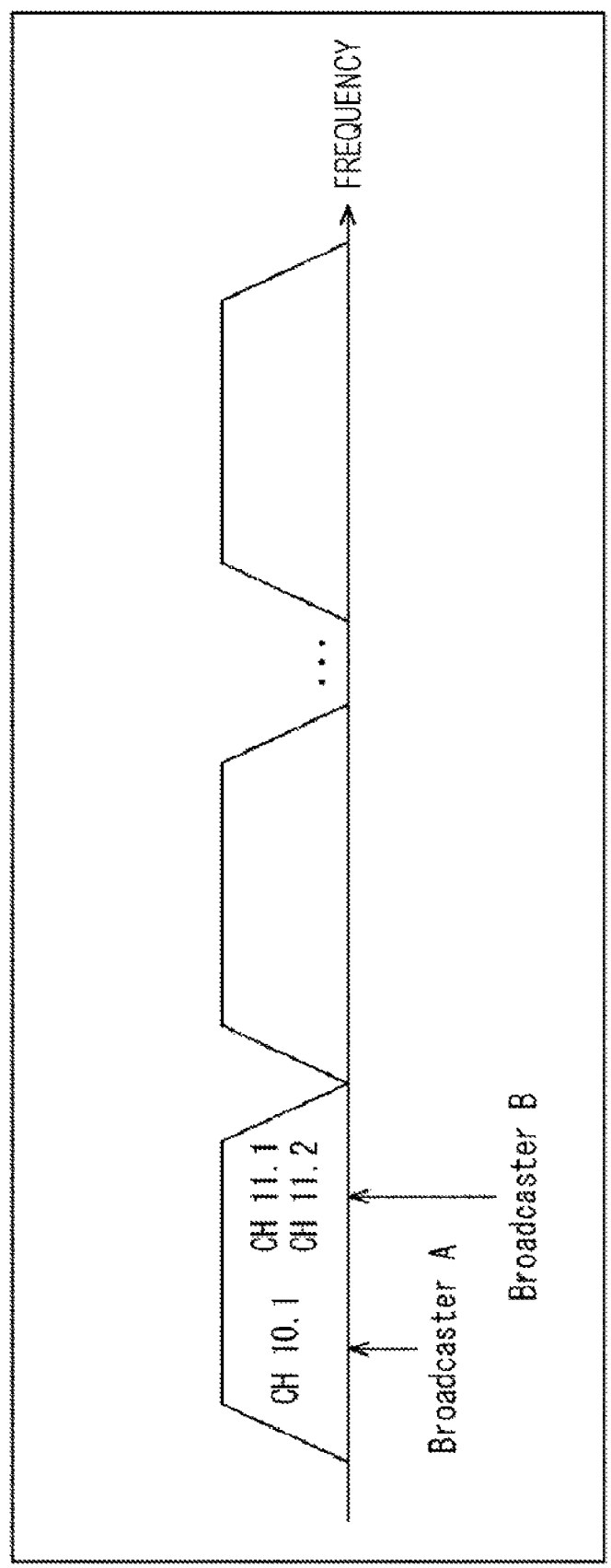
FIG. 11 is a view schematically illustrating a transmission form in a case where a plurality of service providers uses one transmission band.

FIG. 11 is a view schematically illustrating a transmission form in a case where a plurality of service providers uses one transmission band.

In FIG. 11, a case where a plurality of service providers collectively uses one transmission band (such as 6 MHz band) is illustrated. Here, similarly to the transmission form in FIG. 10, a frequency band assigned to a broadcast service is divided by 6 MHz and is managed and used. However, since frequency usage efficiency is improved because of recent improvement in a technology of transmitting a physical layer or a technology of compressing sound or image data, there is influence from expectation that it becomes possible to transmit more services in a transmission band identical to a conventional band. Also, it is requested by an authority that manages a radio frequency to use a radio wave efficiently. In a future broadcast service, it is requested to share one transmission band with a plurality of service providers.

In FIG. 11, an example in which a broadcasting station A (broadcaster A) and a broadcasting station B (broadcaster B) collectively use a first physical channel is illustrated. A form in which the broadcasting station A assigns 10.1 to a channel, the broadcasting station B assigns 11.1 and 11.2 to channels, and services are provided is similar to the transmission form in FIG. 10.

In a transmission form of a broadcast service in FIG. 11, since a plurality of service provider shares one transmission band, it is necessary to describe configuration information of services, which are provided by the plurality of service provider, in a FIT transmitted by the transmission band. In the transmission form of the broadcast service in FIG. 11, in a case where services provided by the transmission band are described in one FIT similarly to the transmission form in FIG. 10, there is a problem that it is necessary to manage and operate the services of the plurality of service providers by equipment on a transmission side (side of transmission device 10).

(Example of Managing and Operating FIT)

Figure 12:
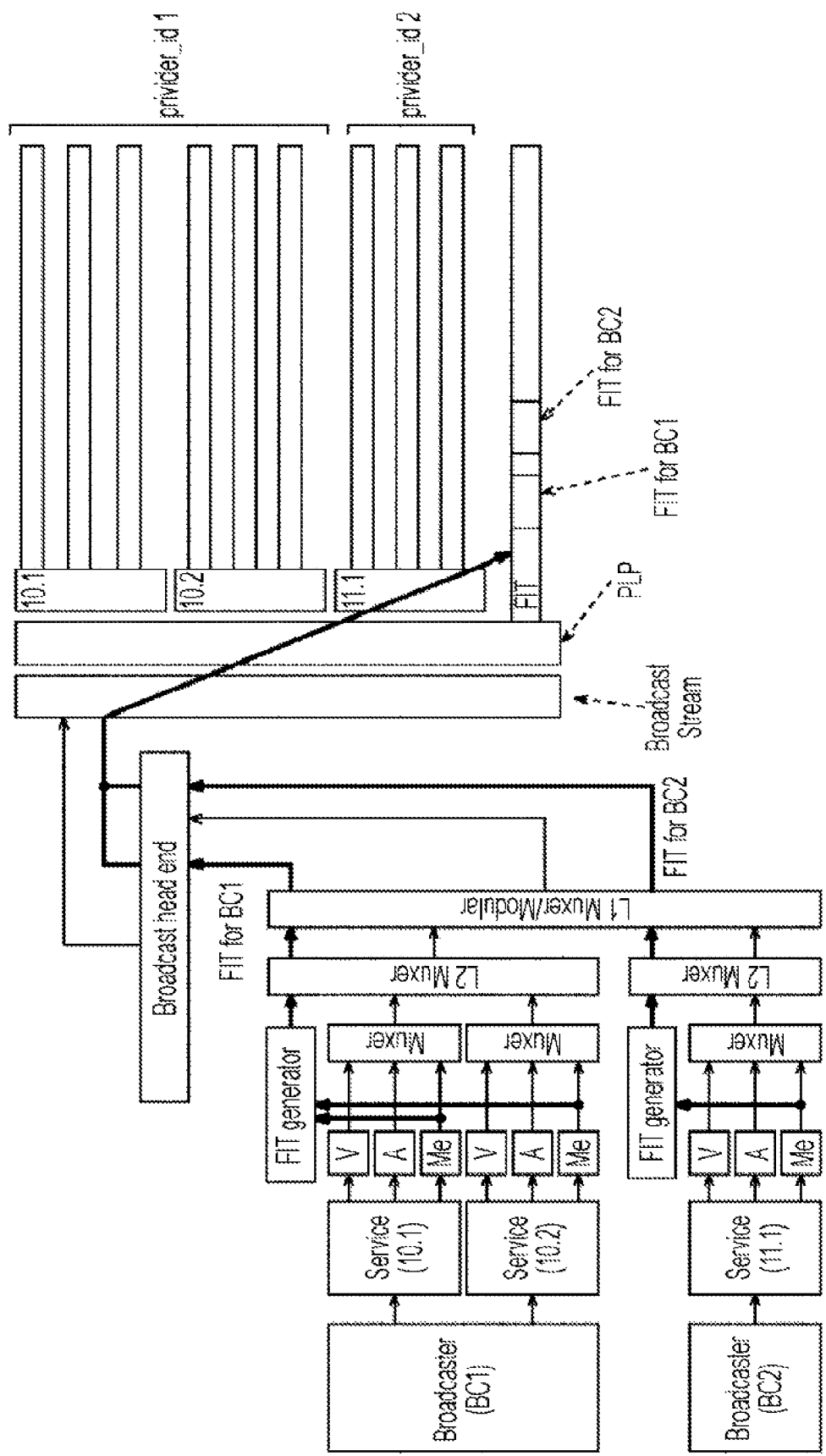
FIG. 12 is a view for describing a transmission processing in a case where a plurality of service providers collectively uses one transmission band.

FIG. 12 is a view for describing transmission processing in a case where a plurality of service providers collectively uses one transmission band.

In FIG. 12, an example in which a broadcasting station (BC1: broadcaster 1) broadcasts channels 10.1 and 10.2 and a broadcasting station (BC2: broadcaster 2) broadcasts a channel 11.1 by one transmission band is illustrated.

While superimposing components included in each service and performing delivery to broadcasting transmission equipment, each of the broadcasting station (BC1) and the broadcasting station (BC2) generates and delivers a FIT in which configuration information of the service is described. That is, to a stream of LLS signaling data transmitting a FIT, a FIT in which service configuration information of the broadcasting station (BC1) is described and a FIT in which service configuration information of the broadcasting station (BC2) is described are transmitted.

In the transmission processing in FIG. 12, each of the broadcasting station (BC1) and the broadcasting station (BC2) generates a FIT based on a service configuration thereof and transmits a service component (component), service metadata (metadata), and the FIT with a broadcasting transmitter (transmission device 10). That is, each service provider independently operates a service. In the present transmission system, as information indicating which service provider provides a FIT, a provider ID (provider_id) is described in a common parameter of an LLS packet header and the FIT, a detail thereof being described with reference to FIG. 13.

(Relationship Between FIT and Service Component)

Figure 13:
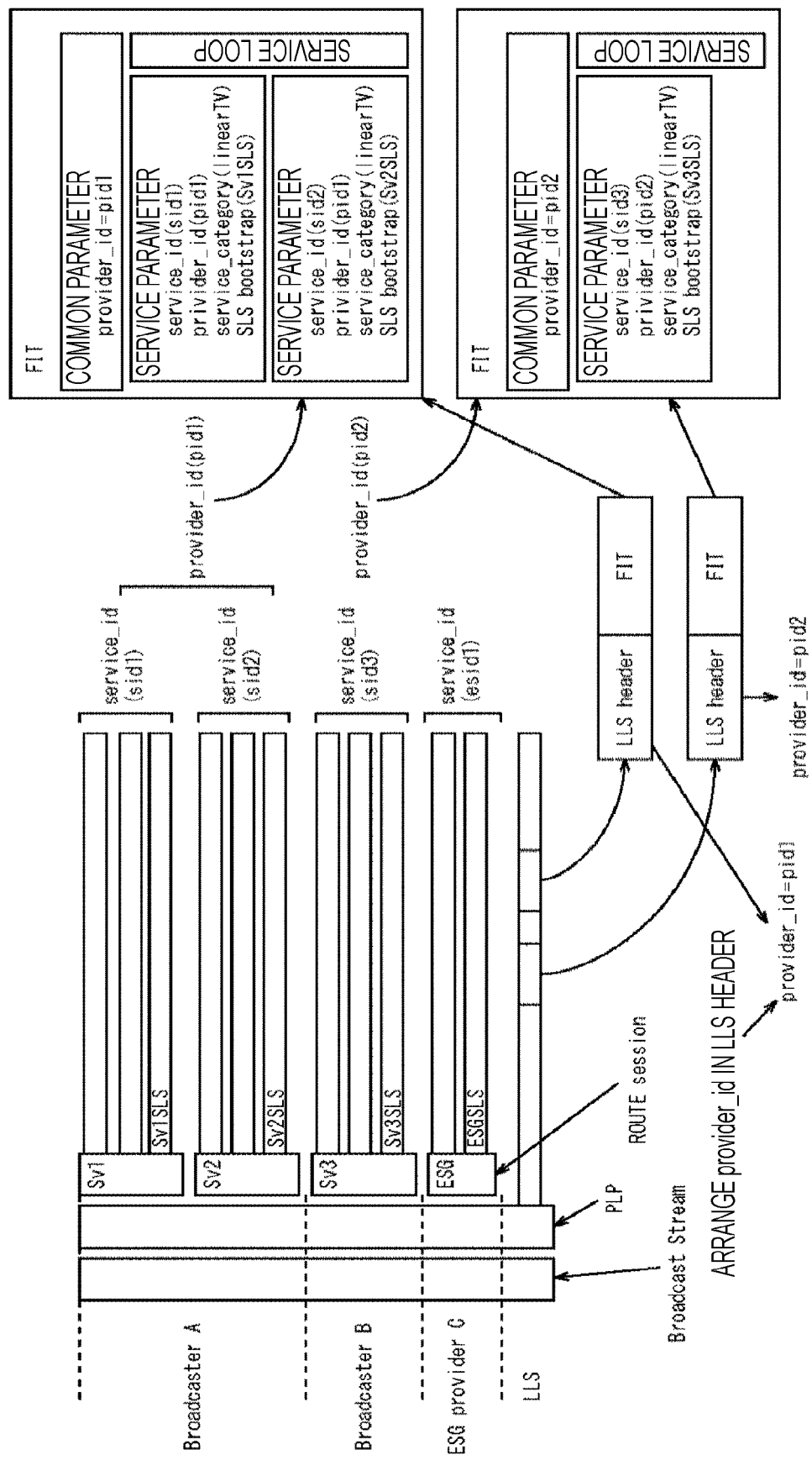
FIG. 13 is a view for describing a relationship between a FIT and a service component in a case where a plurality of service providers collectively uses one transmission band.

FIG. 13 is a view for describing a relationship between a FIT and a service component (component) in a case where a plurality of service providers collectively uses one transmission band.

In FIG. 13, one transmission band is expressed by a broadcast-stream (broadcaster stream). Also, one or a plurality of ROUTE sessions is transmitted by a physical layer pipe (PLP). A component of each service is transmitted by a ROUTE session. To each service, a service ID for identification of the service is assigned. In addition, a provider ID (provider_id) is assigned to each service provider.

A FIT is transmitted by a stream of LLS signaling data. The LLS signaling data is transmitted in an L2 packet (packet in second layer) by the PLP. However, according to operation, the LLS signaling data may be packetized by an L1 frame (frame in first layer), an IP packet, a UDP packet, or a ROUTE packet and transmitted.

A FIT transmitted by a stream of the LLS signaling data is transmitted by a packet to which an LLS header is added. In the LLS header, the FIT and a service provider are associated by a provider ID (provider_id) of a group ID (group_id) illustrated in FIG. 5 or FIG. 7. Also, since a provider ID (provider_id) can be described in a FIT illustrated in FIG. 14 or FIG. 21, the FIT and a service provider are associated.

In the third operation example, in a case where a type transmitted in the LLS header by the packet is signaling (LLS signaling data) and is a FIT and when the signaling is a FIT, the reception device 20 can recognize a service provider that provides the FIT and a transmission cycle sequence. Thus, filtering can be performed efficiently. That is, the reception device 20 can acquire only an intended FIT easily.

Note that in the FIT in FIG. 13, a provider ID (provider_id) is arranged in a common parameter part. This is for association with a stream. Also, in the FIT in FIG. 13, a provider loop of each provider is not prescribed. However, a provider loop may be arranged in a common parameter part instead of the provider ID.

<4. Example of Syntax>

(Syntax of FIT)

FIG. 14 is a view illustrating an example of syntax of a FIT in a binary format.

In FIT_protocol_version having eight bits, version information of a protocol is specified. In Broadcast_stream_id having 16 bits, a broadcast stream ID is specified.

In num_services having eight bits, the number of services is specified. According to the number of services, a service loop is repeated. In class_id having four bits, a class ID is specified. In version having eight bits, a version of a FIT is specified. In a service loop, the following contents are arranged.

In service_id having 16 bits, a service ID of a current service is specified. In provider_id having 16 bits, a provider ID is specified. In service_category having five bits, a category of a current service is specified. For example, as a category, anon real time (NRT) service, an electronic service guide (ESG) service, or the like is specified. In sp_indicator having one bit, encrypted information indicating protection of a current service is specified.

In SLS_simpleservice having one bit, it is indicated whether a current service is a basic service or a rich service. For example, in SLS_simpleservice, "TRUE" is specified in a case of the basic service and "FALSE" is specified in a case of the rich service.

Here, the basic service is a service in which a stream of a component included in a service can be individually identified by an MIME type. In a case where a current service is a basic service, it is possible to connect to a stream of a component by acquiring the MPD and the LSID among the SLS signaling data. Also, the rich service is services other than the basic service. In a case where a current service is the rich service, all pieces of SLS signaling data are necessary for connection to a stream of a component.

In num_srv_level_descriptor having four bits, the number of descriptors of a service level is specified. According to the number of descriptors of a service level, a service level descriptor loop is repeated. In the service level descriptor loop, a service level descriptor (srv_level_descriptor( )) is arranged.

For example, a service status descriptor, a service name descriptor, a capability descriptor, a service bootstrap descriptor, a signaling template descriptor, a signaling over Internet descriptor, or the like is arranged as the service level descriptor. Note that a detailed structure of the service level descriptor will be described later with reference to syntax from FIG. 15 to FIG. 20.

Next to the service loop, num_FIT_level_descriptor having one bit is arranged. In num_FIT_level_descriptor, the number of descriptors of a FIT level is specified. According to the number of descriptors of a FIT level, a FIT level descriptor loop is repeated. In the FIT level descriptor loop, a FIT level description (FIT level_descriptor( )) is arranged.

Note that in FIG. 14, a reserved region (reserved) having one bit is provided next to SLS_simpleservice. Also, a reserved region (reserved) having four bits is provided next to each of the service level descriptor loop and the FIT level descriptor loop.

Next, a detailed structure of a service level descriptor arranged in the service level descriptor loop in FIG. 14 will be described with reference to FIG. 15 to FIG. 20.

(Syntax of Service Status Descriptor)

FIG. 15 is a view illustrating an example of syntax of a service status descriptor (service_status_descriptor) in a binary format.

In descriptor_tag having eight bits, a descriptor tag for identification of each descriptor is specified. Here, a descriptor tag of a service status descriptor is specified. In descriptor_length having eight bits, a descriptor length that is a region in which the number of data bytes following this field is written is specified. Here, a descriptor length of a service status descriptor is specified.

In SLS_data_version having eight bits, version information of SLS signaling data is specified. In service_status having three bits, a status of a current service is specified. For example, as a status, an active state (active) indicating that a current service is currently provided, an inactive state (inactive) indicating that a current service is stopped, or the like is specified.

Note that, a reserved region (reserved) having five bits is provided next to service_status.

(Syntax of Service Name Descriptor)

FIG. 16 is a view illustrating an example of syntax of a service name descriptor (service_name_descriptor) in a binary format.

In descriptor_tag having eight bits and descriptor_length having eight bits, a descriptor tag and a descriptor length of the service name descriptor are respectively specified.

In ISO_639_language_code having 24 bits, a code of a language compliant with an ISO 639 standard is specified. In short_service_name_length having three bits, a length of a short service name is specified. In short_service_name having 16*N bits, a short service name is specified.

Note that a reserved region (reserved) having five bits is provided next to short_service_name_length.

(Syntax of Capability Descriptor)

FIG. 17 is a view illustrating an example of syntax of a capability descriptor (capability_descriptor) in a binary format.

In descriptor_tag having eight bits and descriptor_length having eight bits, a descriptor tag and a descriptor length of the capability descriptor are respectively specified.

In capability code having eight bits, a capability code for providing one service to a plurality of different targets is specified. For example, as the capability code, "2K" or "4K" is specified.

For example, a case where an identical service (such as program) is delivered as an image in 2K resolution (resolution around W 2000×H 1000 pixel) and sound with high robustness to a mobile receiver with an unstable reception environment but is delivered as an image in 4K resolution (resolution around W 4000×H 2000 pixel) and high-quality sound with low robustness to a fixed receiver with a stable reception environment is assumed.

(Syntax of Service Bootstrap Descriptor)

FIG. 18 is a view illustrating an example of syntax of a service bootstrap descriptor (service_bootstrap_descriptor) in a binary format.

In descriptor_tag having eight bits and descriptor_length having eight bits, a descriptor tag and a descriptor length of the service bootstrap descriptor are respectively specified.

In IP_version_flag having one bit, a flag indicating a version of an IP packet is specified. In SLS_src_IP_addr_flag, a flag indicating an IP address of a transmission source (source) of an IP packet is specified. Next to a reserved region having six bits, an IP address of a transmission source (source) is specified as SLS_dst_IP_addr having 32 bits or 128 bits in a case where SLS_src_IP_addr_flag indicates that there is an IP address.

In SLS_dst_IP_addr having 32 bits or 128 bits, an IP address of a destination is specified. In SLS_dst_port_num having 16 bits, a port number is specified. In SLS_TSI having 16 bits, a transport session identifier (TSI) is specified. Also, in SLS_PLP_id having eight bits, an ID for identification of a physical layer pipe (PLP) in which SLS signaling data is transmitted is specified.

By the IP address, the port number, the TSI, and the PLP ID for acquisition of SLS signaling data, SLS bootstrap information is formed.

(Syntax of Signaling Template Descriptor)

FIG. 19 is a view illustrating an example of syntax of a signaling template descriptor (signaling_template_descriptor) in a binary format.

In descriptor_tag having eight bits and descriptor_length having eight bits, a descriptor tag and a descriptor length of the signaling template descriptor are respectively specified.

In encoding type having four bits, type information of encode is specified. In template length having 16 bits, a signaling template length is specified as a region in which the number of data bytes following this field is written. In template having 8*N bits, a signaling template is arranged.

Here, the signaling template is information that can be continuously used in common in a platform and that is provided as a template. Information of a difference from signaling data that can be actually used is provided as difference information. However, in a case of arranging a template of signaling data in an extensible markup language (XML) format, the arrangement is performed after a text format is converted into a binary format according to a predetermined conversion system.

(Syntax of Signaling Over Internet Descriptor)

FIG. 20 is a view illustrating an example of syntax of a signaling over Internet descriptor (signaling_over_internet_descriptor) in a binary format.

In descriptor_tag having eight bits and descriptor_length having eight bits, a descriptor tag and a descriptor length of the signaling over Internet descriptor are respectively specified.

In uri_length having 16 bits, a uniform resource identifier (URI) length is specified as a region in which the number of data bytes following this field is written.

In SLS_uri having 8*N bits, a URI in a case where SLS signaling data is acquired through communication is arranged. For example, in SLS_uri, a URI for acquiring SLS signaling data delivered by the server 30 through the Internet 90 is specified. However, in a case of arranging a URI including a character string in a text format, the arrangement is performed after the text format is converted into a binary format according to a predetermined conversion system.

(Different Example of Syntax of FIT)

FIG. 21 is a view illustrating a different example of syntax of a FIT.

The syntax of the FIT in FIG. 21 is different from the syntax of the FIT in FIG. 14 in a point that num_total_class having four bits and reserved having four bits are added.

In num_total_class, the total number of classes specified in a FIT is specified.

Note since FIG. 21 is similar to the syntax of the FIT in FIG. 14 except for a point that num_total_class and reserved are added, a description thereof is omitted.

Note that in each of FIG. 14 to FIG. 21, a case where a FIT and a service level descriptor are described in a binary format has been illustrated as an example. However, a FIT and a service level descriptor may be described, for example, in a markup language in an XML format. Also, syntax of a FIT and a service level descriptor illustrated in each of FIG. 14 to FIG. 21 is an example and different syntax may be employed. For example, in a FIT in FIG. 14 or FIG. 21, a structure in which class_id and version are not arranged may be employed.

<5. Configuration of Each Device>

Next, a detail configuration of the transmission device 10 and the reception device 20 included in the transmission system in FIG. 1 will be described.

(Configuration of Transmission Device)

Figure 22:
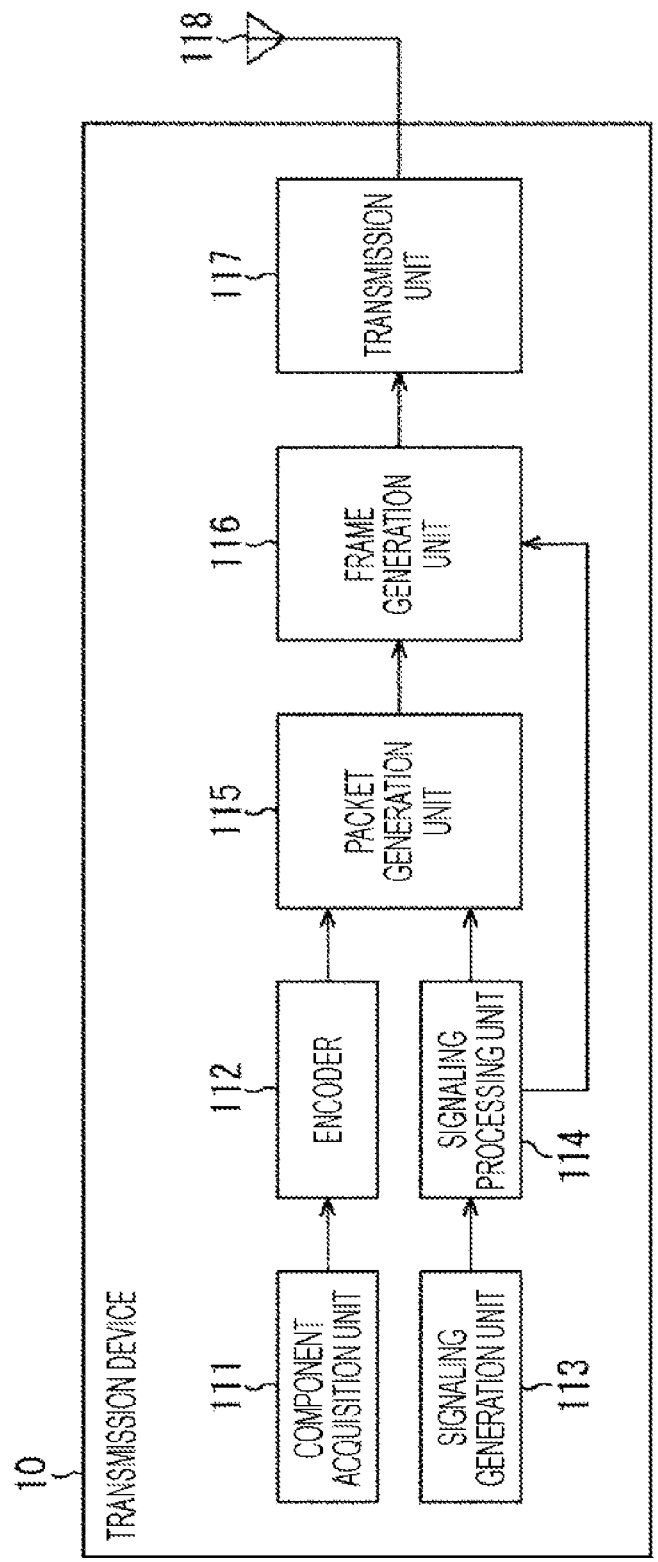
FIG. 22 is a view illustrating a configuration example of a transmission device.

FIG. 22 is a view illustrating a configuration example of the transmission device 10 in FIG. 1.

In FIG. 22, the transmission device 10 includes a component acquisition unit 111, an encoder 112, a signaling generation unit 113, a signaling processing unit 114, a packet generation unit 115, a frame generation unit 116, and a transmission unit 117.

The component acquisition unit 111 acquires data of a component such as a video, audio, or a subtitle from an external server, a built-in storage, a video camera, a microphone, or the like and supplies the data to the encoder 112.

The encoder 112 encodes the data such as a video, audio, or a subtitle supplied by the component acquisition unit 111 in a manner compliant with an encoding system such as a moving picture experts group (MPEG) and supplies the encoded data to the packet generation unit 115.

The signaling generation unit 113 acquires raw data to generate signaling data from an external server, a built-in storage, or the like. The signaling generation unit 113 generates signaling data by using raw data of the signaling data and supplies the signaling data to the signaling processing unit 114. Here, as the signaling data, LLS signaling data and SLS signaling data are generated.

The signaling processing unit 114 processes the signaling data supplied from the signaling generation unit 113 and supplies the processed data to the packet generation unit 115 or the frame generation unit 116.

That is, in a case where an L1 frame transmission system is used, the signaling processing unit 114 supplies a FIT among the LLS signaling data to the frame generation unit 116 and supplies the LLS signaling data other than the FIT and the SLS signaling data to the packet generation unit 115. Also, in a case where an L2 packet transmission system is used, the signaling processing unit 114 supplies the LLS signaling data and the SLS signaling data to the packet generation unit 115.

The packet generation unit 115 generates an IP packet by using the data of a component which data is supplied from the encoder 112 and the signaling data supplied from the signaling processing unit 114. Also, the packet generation unit 115 generates an L2 packet by encapsulating one or a plurality of IP packets and supplies the L2 packet to the frame generation unit 116.

However, in a case where a first L2 packet transmission system is used, the packet generation unit 115 arranges type information, class information, and data version information in an extension header in a header part of an L2 packet. Also, in a case where a second L2 packet transmission system is used, the packet generation unit 115 arranges type information, class information, and data version information in a payload header in a payload part of an L2 packet.

Then, when a FIT is transmitted in a case where the first L2 packet transmission system or the second L2 packet transmission system is used, the packet generation unit 115 sets a bit string indicating "FIT" in type information and sets class information and data version information (version information) in such a manner that an L2 packet is transmitted in a transmission sequence corresponding to the transmission sequence information. Note that in this case, the FIT is arranged in a payload part of the L2 packet.

The frame generation unit 116 generates an L1 frame by encapsulating a plurality of L2 packets supplied from the packet generation unit 115 and supplies the L1 frame to the transmission unit 117.

However, in a case where the L1 frame transmission system is used, the frame generation unit 116 arranges a FIT transmission flag, class information, and version information in a header part of an L1 frame. Then, when a FIT is transmitted in a case where the L1 frame transmission system is used, the frame generation unit 116 sets "TRUE" in a FIT transmission flag and sets class information and version information in such a manner that an L1 frame transmitted in a transmission sequence corresponding to the transmission sequence information. Note that in this case, the FIT is arranged in a header part of the L1 frame.

The transmission unit 117 performs processing such as encoding, digital modulation such as orthogonal frequency division multiplexing (OFDM), upconversion into a radio frequency (RF) band, or power amplification with respect to the L1 frame supplied from the frame generation unit 116 and transmits the processed L1 frame as a digital broadcast signal through an antenna 118.

(Configuration of Reception Device)

Figure 23:
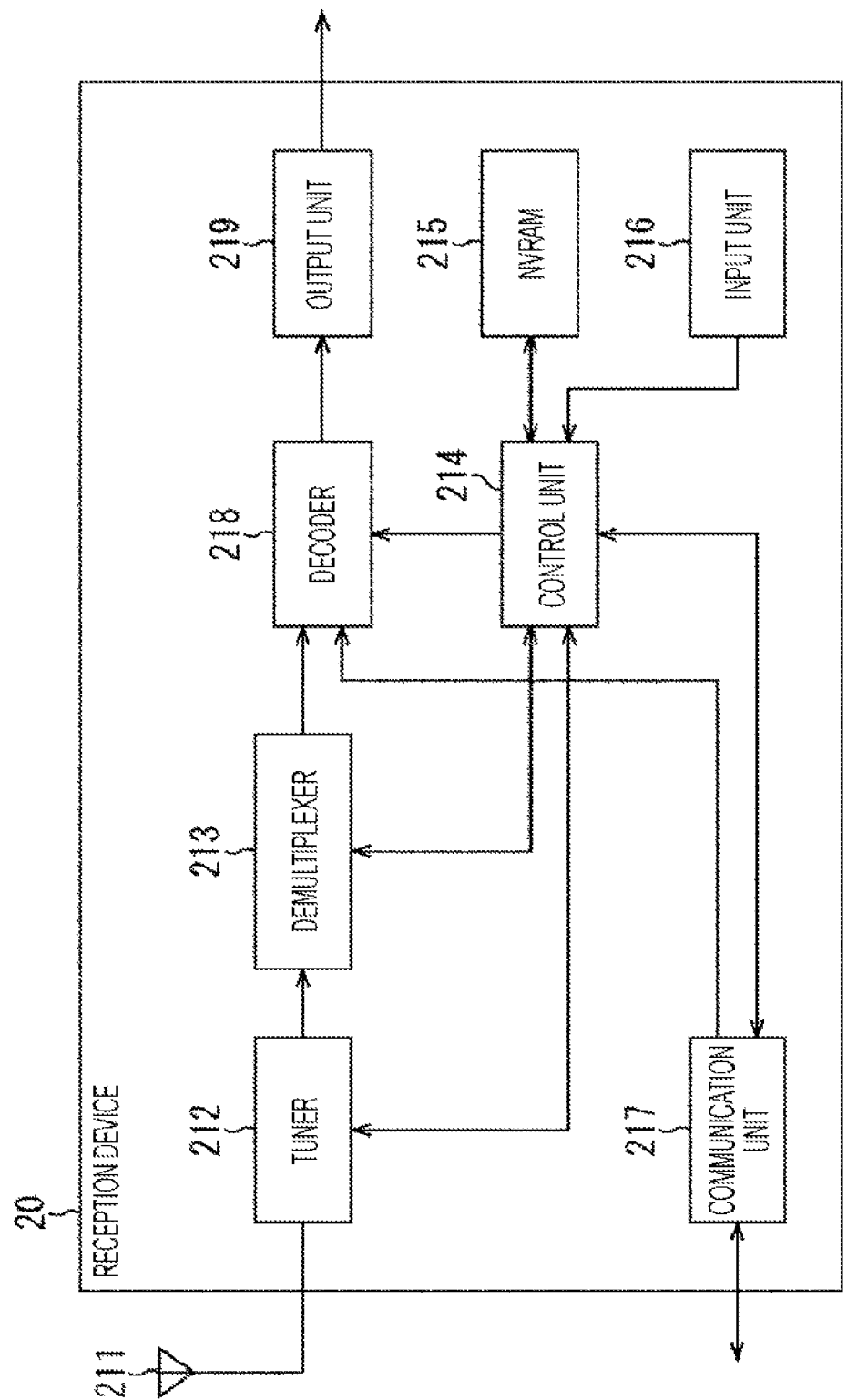
FIG. 23 is a view illustrating a configuration example of a reception device.

FIG. 23 is a view illustrating a configuration example of the reception device 20 in FIG. 1.

In FIG. 23, the reception device 20 includes a tuner 212, a demultiplexer 213, a control unit 214, an NVRAM 215, an input unit 216, a communication unit 217, a decoder 218, and an output unit 219.

According to control from the control unit 214, the tuner 212 performs tuning of a component of a predetermined frequency channel in a digital broadcast signal received in an antenna 211. Also, according to control from the control unit 214, the tuner 212 performs demodulation processing of a tuned digital broadcast signal. In the demodulation processing, demodulation processing with respect to an L1 frame received as a digital broadcast signal is performed and a stream acquired as a result of the demodulation is supplied to the demultiplexer 213.

According to control from the control unit 214, the demultiplexer 213 separates the stream supplied from the tuner 212 into data of a component such as a video, audio, or a subtitle and signaling data. The demultiplexer 213 supplies the data of a component to the decoder 218 and supplies the signaling data to the control unit 214.

The control unit 214 controls an operation of each unit of the reception device 20. Also, on the basis of the signaling data supplied from the demultiplexer 213, the control unit 214 controls the demultiplexer 213 in such a manner that the data of a component such as a video, audio, or a subtitle is supplied to the decoder 218. Also, on the basis of the signaling data supplied from the demultiplexer 213, the control unit 214 controls the communication unit 217.

Here, in a case where an L1 frame transmission system is used, since a FIT transmission flag, class information, and version information are arranged in a header part of an L1 frame processed by the tuner 212, the control unit 214 acquires a FIT arranged in the header part according to transmission sequence information when "TRUE" is set in the FIT transmission flag.

Also, in a case where a first L2 packet transmission system is used, since type information, class information, and data version information are arranged in an extension header in a header part of an L2 packet processed by the demultiplexer 213, the control unit 214 acquires a FIT arranged in a payload part according to transmission sequence information when a bit string indicating "FIT" is set in the type information.

Moreover, in a case where a second L2 packet transmission system is used, since type information, class information, and data version information are arranged in a payload header in a payload part of an L2 packet processed by the demultiplexer 213, the control unit 214 acquires a FIT arranged in the payload part according to transmission sequence information when a bit string indicating "FIT" is set in the type information.

The control unit 214 records the FIT acquired from the L1 frame or the L2 packet into the NVRAM 215. The NVRAM 215 is a non-volatile memory and records various kinds of data (such as FIT) according to control from the control unit 214. The input unit 216 supplies an operation signal to the control unit 214 according to operation of a user.

The communication unit 217 accesses the server 30 through the Internet 90 and requests delivery of the SLS signaling data according to control from the control unit 214. The communication unit 217 receives, through the Internet 90, the SLS signaling data delivered from the server 30 and supplies the data to the control unit 214. The control unit 214 controls the demultiplexer 213 or the communication unit 217 on the basis of the SLS signaling data supplied from the communication unit 217.

The communication unit 217 accesses the server 30 through the Internet 90 and requests delivery of data of a component such as a video, audio, or a subtitle according to control from the control unit 214. The communication unit 217 receives the data of a component such as a video, audio, or a subtitle delivered from the server 30 and supplies the data to the decoder 218.

To the decoder 218, the data of a component such as a video, audio, or a subtitle is supplied from the demultiplexer 213 or the communication unit 217. According to control from the control unit 214, the decoder 218 decodes the data of a component such as a video, audio, or a subtitle in a manner compliant with a decoding system such as MPEG and supplies the data to the output unit 219.

The output unit 219 supplies the data of a video or a subtitle supplied from the decoder 218 to a display (not illustrated). Also, the output unit 219 outputs the data of audio supplied from the decoder 218 to a speaker (not illustrated). Accordingly, an image of a service of a selected channel is displayed on the display and sound corresponding to the image is output from the speaker.

Note that in FIG. 23, in a case where the reception device 20 is a television receiver or the like, a configuration in which a display or a speaker is included can be included. Also, the reception device 20 may include a configuration without a communication function such as the communication unit 217.

<6. Flow of Processing Executed in Each Device>

Next, a flow of processing executed in each device included in the transmission system 1 in FIG. 1 will be described with reference to flowcharts in FIG. 24 to FIG. 28.

(Transmission Processing)

Figure 24:
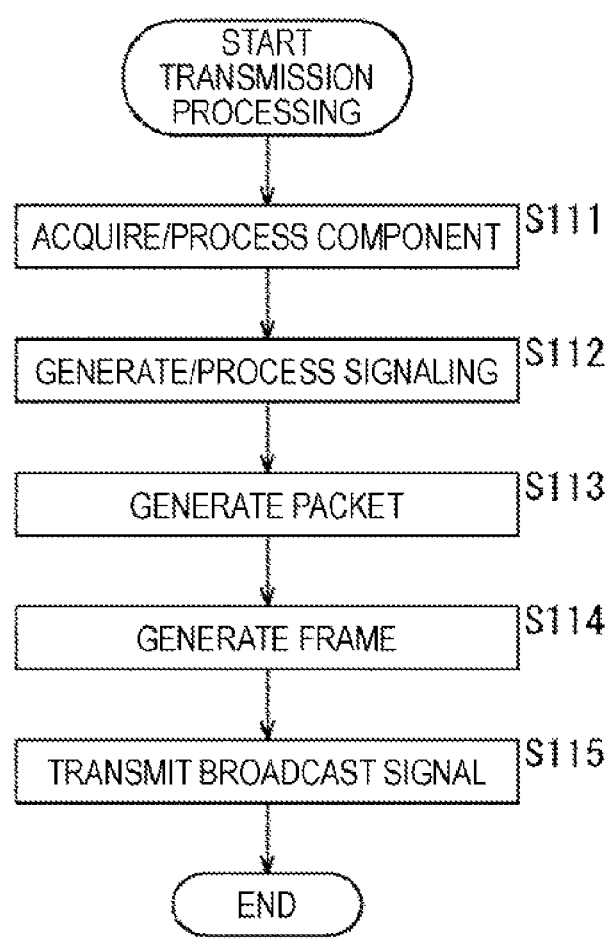
FIG. 24 is a flowchart for describing transmission processing.

First, transmission processing executed by the transmission device 10 in FIG. 1 will be described with reference to the flowchart in FIG. 24.

In step S111, the component acquisition unit 111 acquires data of a component such as a video, audio, or a subtitle from an external server or the like. Also, in step S111, the encoder 112 encodes the data of a video, audio, a subtitle, or the like from the component acquisition unit 111 in a manner compliant with an encoding system such as MPEG.

In step S112, the signaling generation unit 113 generates LLS signaling data or SLS signaling data by using raw data of signaling data acquired from an external server or the like. Also, in step S112, the signaling processing unit 114 processes the LLS signaling data or the SLS signaling data.

In step S113, the packet generation unit 115 generates an L2 packet on the basis of the data of a component from the encoder 112 and the signaling data from the signaling processing unit 114. For example, in a case where a first L2 packet transmission system is used, the packet generation unit 115 sets type information, class information, and data version information in an extension header in a header part of an L2 packet and arranges a FIT in a payload part in such a manner that the L2 packet is transmitted in a transmission sequence corresponding to transmission sequence information.

Note that pieces of control information necessary for channel selection of a service which pieces of information are generated by service providers may be arranged and transmitted as one FIT or each service provider may generate, arrange, and transmit a FIT in which control information necessary for channel selection of each service is described. In the former case, one value is specified as a provider ID (provider_id). On the other hand, in the latter case, it is necessary to respectively specify different values for provider IDs (provider_id) of a plurality of providers and to perform transmission in such a manner that the reception device 20 can identify a sequence of a FIT provided by each service provider.

In step S114, the frame generation unit 116 generates an L1 frame on the basis of the L2 packet from the packet generation unit 115. However, in a case where an L1 frame transmission system is used, the frame generation unit 116 sets a FIT transmission flag, class information, and version information in a header part of the L1 frame and arranges a FIT in the header part in such a manner that the L1 frame is transmitted in a transmission sequence corresponding to transmission sequence information.

In step S115, the transmission unit 117 performs processing such as OFDM digital modulation with respect to the L1 frame from the frame generation unit 116 and transmits the processed frame as a digital broadcast signal through the antenna 118.

In the above, a flow of the transmission processing has been described. In the transmission processing, in a case where then L1 frame transmission system is used, an L1 frame in a header part of which a FIT is arranged is transmitted in a transmission sequence corresponding to transmission sequence information. In a case where the L2 packet transmission system is used, an L2 packet in a payload part of which a FIT is arranged is transmitted in a transmission sequence corresponding to transmission sequence information.

(Initial Scanning Processing)

Next, a flow of initial scanning processing executed by the reception device 20 in FIG. 1 will be described with reference to the flowchart in FIG. 25.

In step S211, an operation signal or the like from the input unit 216 is monitored by the control unit 214. When an event of starting the initial scanning processing is generated, the initial scanning processing is started and the processing goes to step S212.

In step S212, the tuner 212 performs frequency scanning processing according to control from the control unit 214. In step S213, it is determined whether frequency scanning is successful in the frequency scanning processing in step S212.

When it is determined in step S213 that the frequency scanning is not successful, the processing goes back to the processing in step S212 and the frequency scanning processing is performed again. On the other hand, it is determined in step S213 that the frequency scanning is successful, the processing goes to step S214.

In step S214, FIT acquisition processing is performed. In the FIT acquisition processing, when a FIT for initial scanning is transmitted by an L1 frame in a case where an L1 frame transmission system is used, the FIT is acquired and recorded. Also, when a FIT for initial scanning is transmitted by an L2 packet in a case where an L2 packet transmission system is used, the FIT is acquired and recorded. Note that detailed contents of the FIT acquisition processing will be described later with reference to the flowchart in FIG. 26.

When the FIT acquisition processing is over, the processing goes to step S215. In step S215, it is determined whether scanning of all frequency bands is completed.

When it is determined in step S215 that scanning of all frequency bands is not yet completed, the processing goes back to step S212 and the processing in and after step S212 is repeated. Accordingly, frequency scanning processing in each frequency band is performed and a FIT for initial scanning is acquired and recorded. Then, when it is determined in step S215 that scanning of all frequency bands is over, the frequency scanning processing in FIG. 25 is ended.

In the above, a flow of the initial scanning processing has been described.

(FIT Acquisition Processing)

Next, a detail of the FIT acquisition processing corresponding to the processing in step S214 in FIG. 25 will be described with reference to the flowchart in FIG. 26.

Note that contents of the FIT acquisition processing in the L1 frame transmission system and that in the L2 packet transmission system are different. Thus, the FIT acquisition processing in a case where the L1 frame transmission system is used will be described first. Then, the FIT acquisition processing in a case where the L2 packet transmission system is used will be described. However, the first L2 packet transmission system will be described as a representative of the L2 packet transmission system.

(1) FIT acquisition processing in case where L1 frame transmission system is used In step S231, the tuner 212 performs demodulation processing of a digital broadcast signal and acquires an L1 frame (current L1 frame). Note that information in a header part of the current L1 frame is supplied to the control unit 214.

In step S232, the control unit 214 determines whether a FIT transmission flag (FIT_delivery_flag) in the header part of the current L1 frame is "TRUE," that is, whether a FIT is transmitted.

In a case where it is determined in step S232 that a FIT is transmitted, the processing goes to step S233. In step S233, the control unit 214 determines whether a class ID (class_id) included in FIT version information (FIT version) in the header part of the current L1 frame indicates a sequence of a FIT for initial scanning.

When it is determined in step S233 that the class ID indicates the sequence of the FIT for initial scanning, the processing goes to step S234. In step S234, the control unit 214 acquires the FIT arranged in the header part of the current L1 frame and records the FIT into the NVRAM 215 as channel selection information.

Here, for example, in a FIT for initial scanning (such as $FIT_M$ in middle cycle with class ID being "00"), a service name descriptor, a capability descriptor, and a service bootstrap descriptor are arranged as service level descriptors. Thus, contents described in these descriptors are recorded. Note that in a case where $FIT_S$ are transmitted by a plurality of service providers indicated by provider IDs (provider_id), the reception device 20 records information, which is necessary for channel selection of a service and which is acquired for each service provider, by the processing from step S231 to step S234 (FIT acquisition processing).

Figure 25:
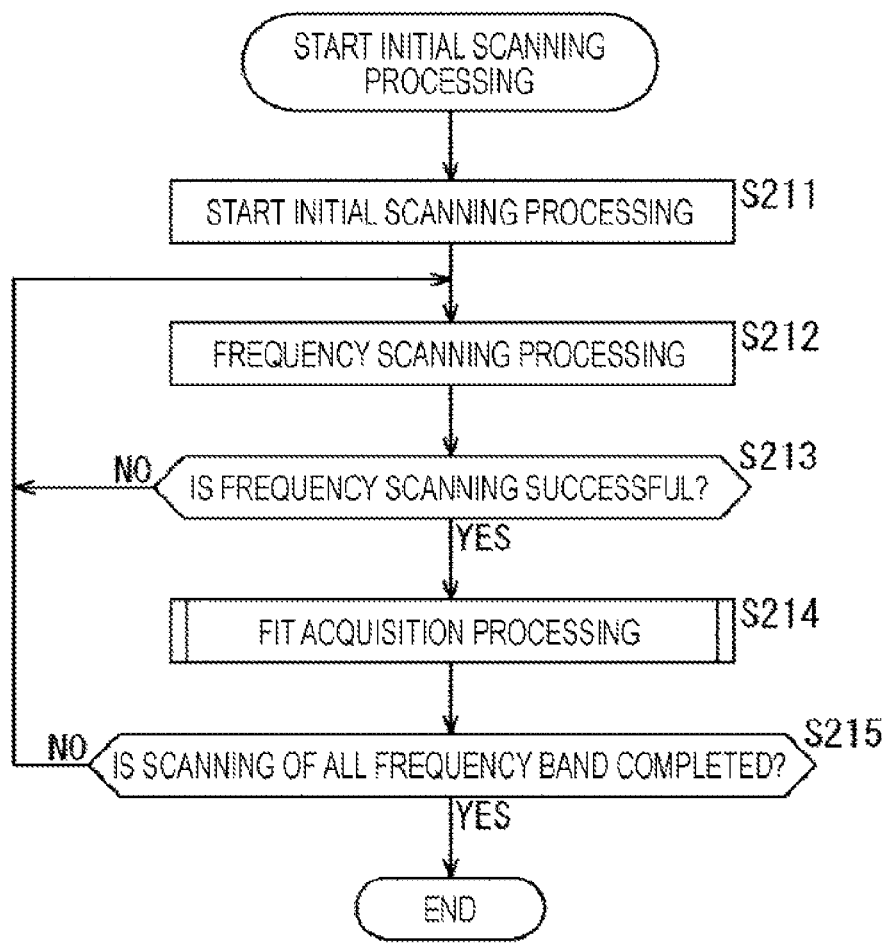
FIG. 25 is a flowchart for describing initial scanning processing.
Figure 26:
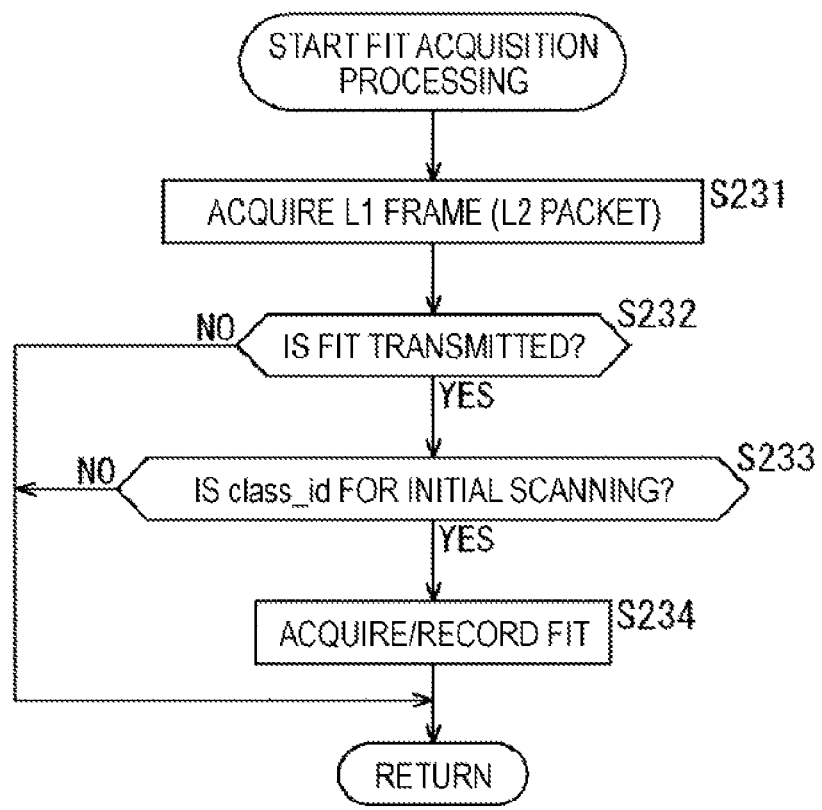
FIG. 26 is a flowchart for describing FIT acquisition processing.

Then, when the processing in step S234 is over, the processing goes back to step S214 in FIG. 25 and the processing in and after the step is repeated. Note that in a case where it is determined in step S232 that no FIT is transmitted or in a case where it is determined in step S233 that a class ID does not indicate a sequence of a FIT for initial scanning, the processing in step S233 or step S234 is skipped and the processing goes back to the processing in step S214 in FIG. 25.

In the above, a flow of the FIT acquisition processing in a case where the L1 frame transmission system is used has been described.

(2) FIT acquisition processing in case where first L2 packet transmission system is used In step S231, the demultiplexer 213 acquires an L2 packet (current L2 packet). Note that information in a header part or a payload header of the current L2 packet is supplied to the control unit 214.

In step S232, the control unit 214 determines whether a bit string indicating "FIT" is set in type information (type) in an extension header in the header part of the current L2 packet, that is, whether a FIT is transmitted.

In a case where it is determined in step S232 that a FIT is transmitted, the processing goes to step S233. In step S233, the control unit 214 determines whether a class ID (class_id) included in extension-type information arranged in the extension header in the header part of the current L2 packet indicates a sequence of a FIT for initial scanning.

When it is determined in step S233 that the class ID indicates the sequence of the FIT for initial scanning, the processing goes to step S234. In step S234, the control unit 214 acquires a FIT arranged in a payload part of the current L2 packet and records the FIT into the NVRAM 215 as channel selection information.

Here, for example, in a FIT for initial scanning (such as $FIT_M$ in middle cycle with class ID being "00"), a service name descriptor, a capability descriptor, and a service bootstrap descriptor are arranged as service level descriptors. Thus, contents described in these descriptors are recorded. Note that in a case where $FIT_S$ are transmitted by a plurality of service providers indicated by provider IDs (provider_id), the reception device 20 records information, which is necessary for channel selection of a service and which is acquired for each service provider, by the processing from step S231 to step S234 (FIT acquisition processing).

Then, when the processing in step S234 is over, the processing goes back to step S214 in FIG. 25 and the processing in and after the step is repeated. Note that in a case where it is determined in step S232 that no FIT is transmitted or in a case where it is determined in step S233 that a class ID does not indicate a sequence of a FIT for initial scanning, the processing in step S233 or step S234 is skipped and the processing goes back to the processing in step S214 in FIG. 25.

Note that in the above-described processing, a case where the first L2 packet transmission system is used has been described. In a case where the second L2 packet transmission system is used, type information (type) is arranged in a payload header in a payload part of a current L2 packet. Also, a class ID is included in extension-type information in the payload header in the payload part of the current L2 packet.

In the above, a flow of the FIT acquisition processing in a case where the first L2 packet transmission system is used has been described.

In the FIT acquisition processing, for example, the reception device 20 only needs to acquire (extract) a FIT with a class ID being "00" ($FIT_M$ in middle cycle). Thus, processing can be performed efficiently. Specifically, in a case of performing initial scanning processing, it is possible to complete the initial scanning processing promptly by ignoring a FIT with a class ID being "10" ($FIT_L$ in long cycle).

(Channel Selection Processing)

Figure 27:
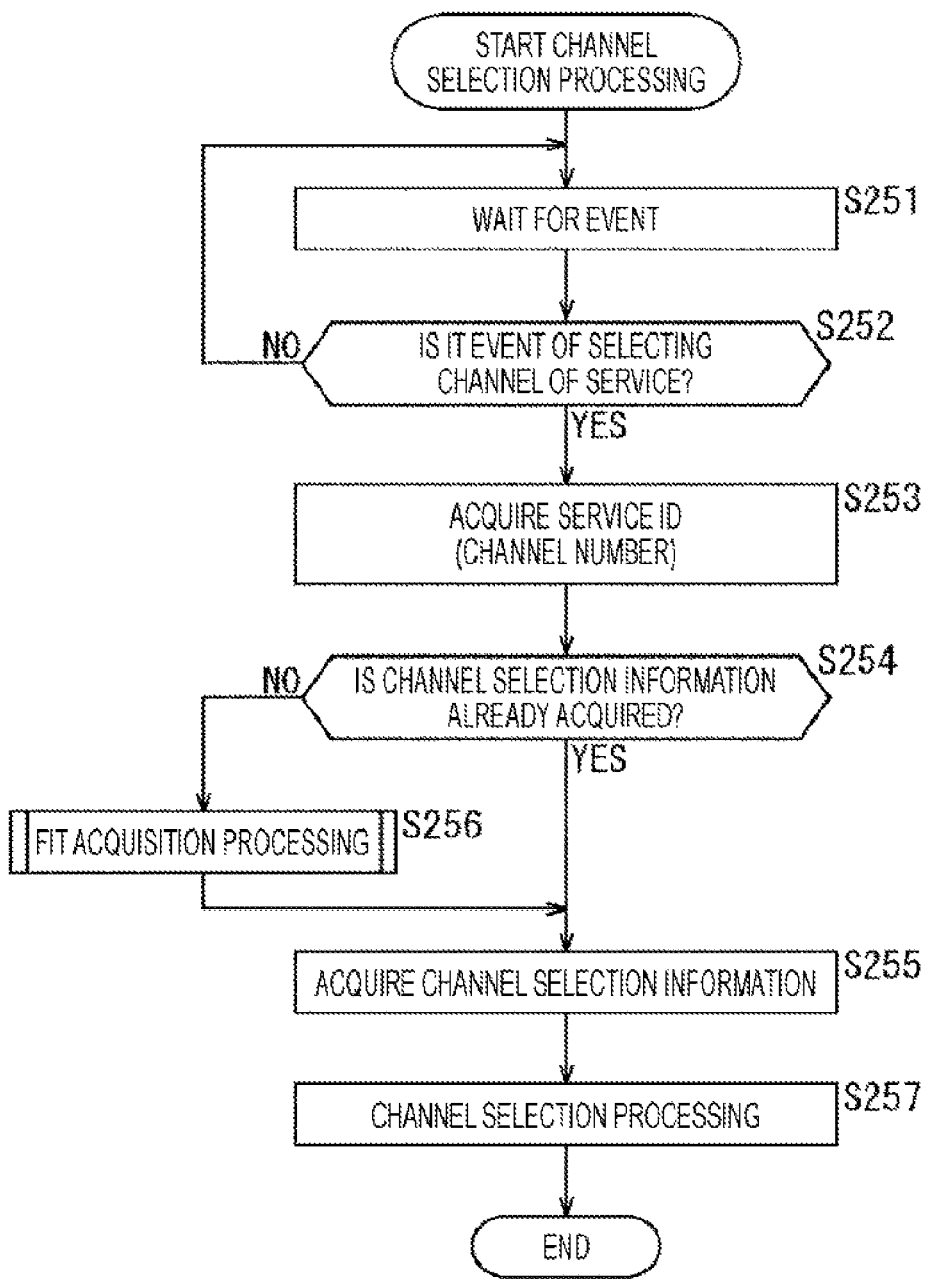
FIG. 27 is a flowchart for describing channel selection processing.

Next, a flow of channel selection processing executed by the reception device 20 in FIG. 1 will be described with reference to the flowchart in FIG. 27.

In step S251, an operation signal or the like from the input unit 216 is monitored by the control unit 214 and waiting is performed until an event of selecting a channel of a service is generated. Then, when it is determined in step S252 that the event of selecting a channel of a service is generated, the processing goes to step S253.

In step S253, the control unit 214 acquires a service ID (channel number) corresponding to the service of the selected channel. Also, in step S254, the control unit 214 refers to the NVRAM 215 and determines whether channel selection information (FIT) is recorded and acquired.

When it is determined in step S254 that the channel selection information is already acquired, the processing goes to step S255. In step S255, the control unit 214 reads and acquires the channel selection information (FIT) recorded in the NVRAM 215.

On the other hand, when it is determined in step S254 that the channel selection information is not yet acquired, the processing goes to step S256. In step S256, the FIT acquisition processing is performed. In the FIT acquisition processing, in a case where the L1 frame transmission system is used, a FIT for initial scanning which FIT is transmitted by an L1 frame is acquired and recorded. Also, in a case where the L2 packet transmission system is used, a FIT for initial scanning which FIT is transmitted by an L2 packet is acquired and recorded. Note that detailed contents of the FIT acquisition processing are in a manner described above in the description of the flowchart in FIG. 26.

In step S257, the tuner 212, the demultiplexer 213, the control unit 214, and the like perform channel selection processing that is based on the channel selection information (FIT) acquired in the processing in step S255. In the reception device 20, an image and sound of a service of a selected channel are output as a result of the channel selection processing.

In the above, a flow of the channel selection processing has been described.

(FIT Acquisition Processing During Channel Selection)

Figure 28:
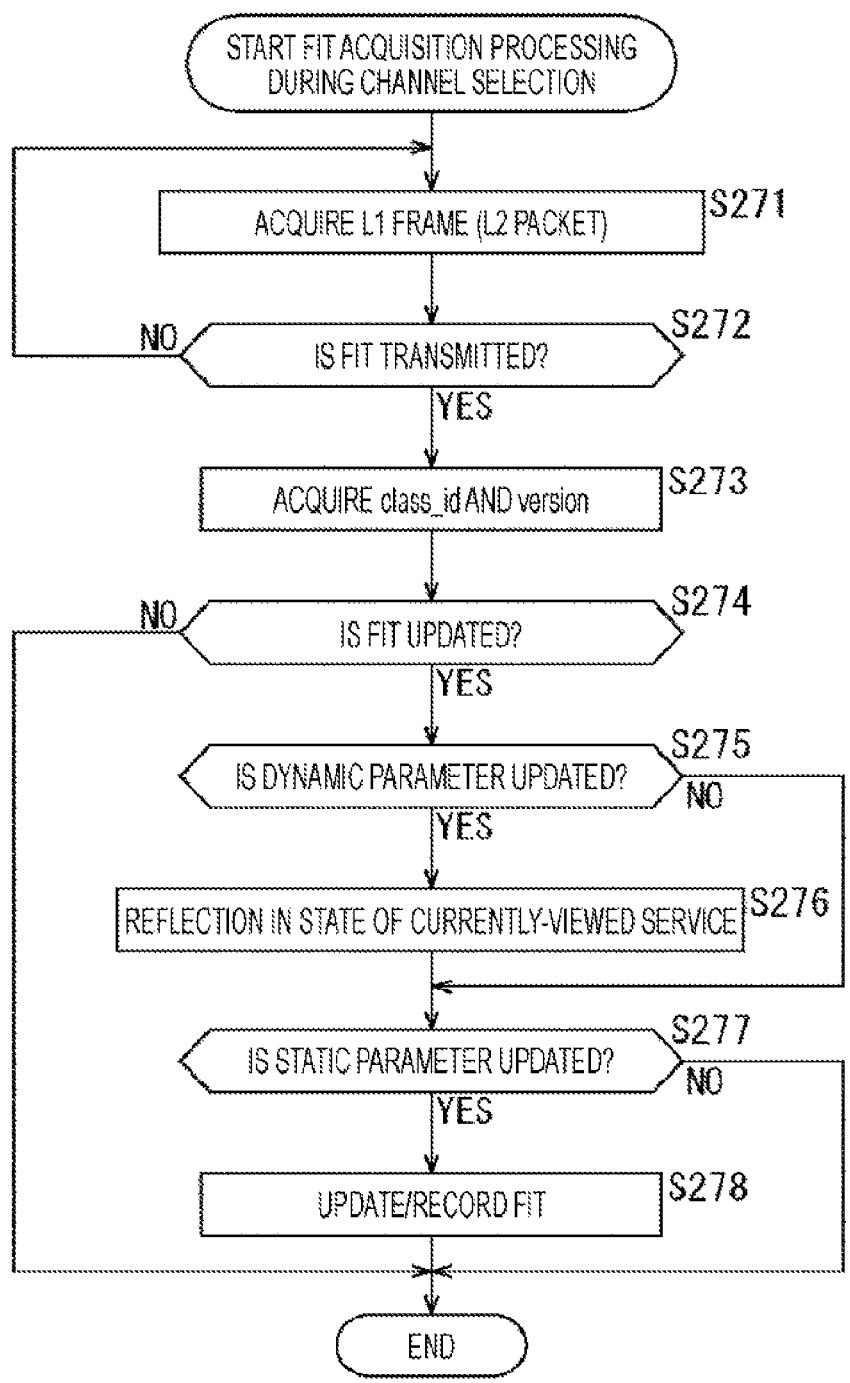
FIG. 28 is a flowchart for describing FIT acquisition processing during channel selection.

Finally, with reference to the flowchart in FIG. 28, a flow of FIT acquisition processing during channel selection which processing is executed by the reception device 20 in FIG. 1 will be described. However, it is assumed that the channel selection processing in FIG. 27 is executed and a service of a selected channel is viewed before execution of the processing in the flowchart in FIG. 28.

Note that contents of the FIT acquisition processing during channel selection in an L1 frame transmission system and that in an L2 packet transmission system are different. Thus, the FIT acquisition processing during channel selection in a case where the L1 frame transmission system is used will be described first. Then, the FIT acquisition processing during channel selection in a case where the L2 packet transmission system is used will be described. However, the first L2 packet transmission system will be described as a representative of the L2 packet transmission system.

(1) FIT acquisition processing during channel selection in case where L1 frame transmission system is used In step S271, the tuner 212 performs demodulation processing of a digital broadcast signal and acquires an L1 frame (current L1 frame). Note that information in a header part of the current L1 frame is supplied to the control unit 214.

In step S272, the control unit 214 determines whether a FIT transmission flag (FIT_delivery_flag) in the header part of the current L1 frame is "TRUE," that is, whether a FIT is transmitted.

When a FIT transmission flag becomes "FALSE" and it is determined in step S272 that no FIT is transmitted, the processing goes back to step S271 and the processing in and after the step is repeated. Then, when the processing from step S271 to step S272 is repeated and an L1 frame with a FIT transmission flag being "TRUE" is acquired, the processing goes to step S273.

In step S273, the control unit 214 acquires class ID (class_id) and version information (version) included in FIT version information (FIT version) in the header part of the current L1 frame.

In step S274, on the basis of the class ID and the version information acquired in step S273, the control unit 214 determines whether the FIT is updated. Here, the class ID includes a provider ID (provider_id) and a delivery class ID (delivery_group_id). That is, when a service provider that provides a FIT is different, the class ID is different. Thus, here, it is determined whether a FIT is updated with respect to each service provider.

When it is determined in step S274 that the FIT is updated, the processing goes to step S275. In step S275, the control unit 214 determines whether a FIT of a sequence that transmits a dynamic parameter is updated.

When it is determined in step S275 that the FIT of the sequence that transmits a dynamic parameter is updated, the processing goes to step S276. In step S276, the control unit 214 reflects contents of a FIT, which includes a dynamic parameter, in a state of a service that is currently viewed.

Here, for example, since a service status descriptor is described as a service level descriptor in the FIT in the sequence of transmitting the dynamic parameter (such as $FIT_S$ in short cycle with class ID being "00"), the currently-viewed service is ended in a case where an inactive state (inactive) is specified as a status of the current service.

Note that in a case where it is determined in step S275 that the FIT in the sequence transmitting the dynamic parameter is not updated, the processing goes to step S277. In step S277, the control unit 214 determines whether a FIT of a sequence that transmits a static parameter is updated.

When it is determined in step S277 that a FIT that transmits a static parameter is updated, the processing goes to step S278. In step S278, the control unit 214 updates a FIT including a static parameter and records the parameter into the NVRAM 215.

Here, for example, since a signaling template descriptor or a signaling over Internet descriptor is described in the FIT transmitting the static parameter (such as $FIT_L$ in long cycle with class ID being "10"), a URI to acquire a signaling template or SLS signaling data is updated.

When the processing in step S278 is over, the FIT acquisition processing during channel selection is ended. Note that in a case where it is determined in step S277 that the FIT in the sequence transmitting the static parameter is not updated, the processing in step S278 is skipped. Also, in a case where it is determined in step S274 that the FIT is not updated, the processing in step S275 to step S278 is skipped.

In the above, a flow of the FIT acquisition processing during channel selection in a case where the L1 frame transmission system is used has been described.

(2) FIT acquisition processing during channel selection in case where first L2 packet transmission system is used In step S271, the demultiplexer 213 acquires an L2 packet (current L2 packet). Note that information in a header part or a payload header of the current L2 packet is supplied to the control unit 214.

In step S272, the control unit 214 determines whether a bit string indicating "FIT" is set in type information (type) in an extension header in the header part of the current L2 packet, that is, whether a FIT is transmitted. In step S272, in a case where it is determined that the FIT is transmitted, the processing goes to step S273.

In step S273, the control unit 214 acquires a class ID (class_id) included in extension-type information arranged in the extension header in the header part of the current L2 packet and data version information (data version) arranged in the extension header.

In step S274, on the basis of the class ID and the data version information acquired in step S273, the control unit 214 determines whether the FIT is updated. Here, the class ID includes a provider ID (provider_id) and a delivery class ID (delivery_group_id). That is, when a service provider that provides a FIT is different, the class ID is different. Thus, here, it is determined whether a FIT is updated with respect to each service provider.

Note that the processing in step S275 to step S278 is similar to that in the above-described FIT acquisition processing during channel selection in a case where the L1 frame transmission system is used and a description thereof is omitted to avoid a repetitious description. However, in a case where the first L2 packet transmission system is used, a FIT is arranged in a payload part of a current L2 packet.

Note that in the above-described processing, a case where the first L2 packet transmission system is used has been described. In a case where the second L2 packet transmission system is used, type information (type) is arranged in a payload header in a payload part of a current L2 packet. Also, a class ID is included in extension-type information in the payload header in the payload part of the current L2 packet.

In the above, a flow of the FIT acquisition processing during channel selection in a case where the first L2 packet transmission system is used has been described.

In the FIT acquisition processing during channel selection, transmission sequence information (class information and version information) is set in a header part of an L1 frame or in an extension header in a header part of an L2 packet. Thus, $FIT_S$ are classified into a plurality of sequences by each class and the $FIT_S$ are transmitted in a plurality of transmission cycles. For example, a $FIT_S$ in a short cycle (such as cycle of 100 milliseconds), a $FIT_L$ in a long cycle (such as cycle of 10 seconds), and a $FIT_M$ in a middle cycle (such as cycle of one second) are transmitted. Thus, by varying a service level descriptor arranged in a FIT in each transmission cycle, the reception device 20 can acquire information with a temporal limit, information with no temporal limit, or the like at appropriate timing according to usage.

Moreover, since a provider ID (provider_id) for identification of a service provider providing a FIT is set as transmission sequence information, it is possible to classify $FIT_S$ by each service provider. For example, $FIT_S$ provided by a broadcasting station A that broadcasts channels 10.1 and 10.2, a broadcasting station B that broadcasts a channel 11.1, and an ESG service provider C that delivers ESG metadata of the channels 10.1, 10.2, and 11.1 can be delivered in different sequences. In this case, when the channel 10.1 is viewed in the reception device 20, it is possible to acquire a dynamic parameter of a service by monitoring the FIT of the broadcasting station A. Thus, it is possible to perform filtering and to acquire only a FIT suitable for a viewing condition of the service.

<7. Modification Example>

In the above description, since employment of digital broadcasting using an IP transmission system is expected in ATSC 3.0 that is a next-generation broadcasting standard in the US and that is currently developed, ATSC that is a system employed in the US and the like is described as an example of a standard of digital broadcasting. However, application to integrated services digital broadcasting (ISDB) employed in Japan and the like or digital video broadcasting (DVB) employed in countries in Europe may be performed. Also, employment may be performed not only in digital terrestrial broadcasting but also in digital satellite broadcasting or digital cable television broadcasting.

Also, in the above description, "D" that is an abbreviation of description is used as a name of signaling data. However, there is a case where "T" that is an abbreviation of a table is used. For example, there is a case where a service parameter description (SPD) is described as a service parameter table (SPT). However, a difference in these names is simply a formal difference between a "description" and a "table" and there is no difference in actual contents of each piece of signaling data.

Moreover, in the above description, a configuration element of signaling data in a case where the signaling data is described in a binary format has been described. However, a name of the configuration element is just an example and a different name may be employed. For example, a "broadcast stream ID (Broadcast_stream_id)" prescribed in a FIT may be referred to as a "network ID (Network ID)," an "RF allocation ID (RF Alloc ID)," an "RF channel ID (RF Channel ID)," or the like. However, a difference in these names is simply a formal difference and there is no difference in actual contents of the configuration element.

Moreover, in the above description, it has been described that a class ID includes a provider ID (provider_id) and a delivery class ID (delivery_group_id). However, depending on an operation form of an actual service, a class ID may be used in different transmission sequence information. For example, in a case where a service provider configures a channel according to a decoding/outputting capability (such as H.264/AVC or HEVC, or 4K or 2K) of the reception device 20, a capability of the reception device 20 which capability is necessary for reception of a service may be indicated. Also, in a case where a service provider wants to provide a broadcasting channel only to a specific region, a part of a class ID may be a value associated to a region code (such as one or a plurality of zip code, latitude/longitude information, and the like). Also, in a case where a FIT describes a plurality of services by a service loop, transmission may be performed in a plurality of transmission sequences by each description of a service. That is, a class ID is not limited to the above-described example and may be used as an identifier indicating a plurality of transmission sequences.

Also, in the above description, a "class ID" is used as a name of an ID for identification of a transmission sequence. However, there is a case where a different name is used. For example, since a group of a transmission sequence of a FIT is indicated, a "group ID," a "transmission group ID," a "segment ID," a "transmission segment ID," a "part number," the "total number of parts," a "part ID," or the like may be employed. Also, a "provider ID (provider_id)" may be referred to as a "provider tag (provider tag)" or the like. A difference in these names is simply a formal difference and there is no difference in actual contents of the configuration element.

<8. Configuration of Computer>

The series of above-described processing can be executed by hardware or by software. When the series of processing is executed by software, a program included in the software is installed into a computer. FIG. 29 is a view illustrating a configuration example of hardware of a computer to execute the above-described series of processing with a program.

In a computer 900, a central processing unit (CPU) 901, a read only memory (ROM) 902, and a random access memory (RAM) 903 are connected to each other by a bus 904. To the bus 904, an input/output interface 905 is further connected. To the input/output interface 905, an input unit 906, an output unit 907, a recording unit 908, a communication unit 909, and a drive 910 are connected.

The input unit 906 includes a keyboard, a mouse, a microphone, or the like. The output unit 907 includes a display, a speaker, or the like. The recording unit 908 includes a hard disk, a nonvolatile memory, or the like. The communication unit 909 includes a network interface or the like. The drive 910 drives a removable medium 911 such as a magnetic disk, an optical disk, a magneto optical disk, or a semiconductor memory.

In the computer 900 configured in such a manner, the CPU 901 loads a program recorded in the ROM 902 or the recording unit 908 into the RAM 903 through the input/output interface 905 and the bus 904 and executes the program, whereby the above-described series of processing is performed.

For example, the program executed by the computer 900 (CPU 901) can be recorded in the removable medium 911, which functions as a package medium or the like, when being provided. Also, the program can be provided through a wired or wireless transmission medium such as a local area network, the Internet, or digital satellite broadcasting.

In the computer 900, by mounting the removable medium 911 to the drive 910, the program can be installed into the recording unit 908 through the input/output interface 905. Also, the program can be received in the communication unit 909 through the wired or wireless transmission medium and can be installed into the recording unit 908. In addition, the program can be previously installed in the ROM 902 or the recording unit 908.

Here, in the present description, processing performed by the computer according to the program is not necessarily performed in a time sequence in order described in a flowchart. That is, the processing performed by the computer according to the program includes processing executed in parallel or individually (such as parallel processing or processing by object). Also, the program may be processed by one computer (processor) or processed in a distributed manner by a plurality of computers.

Note that an embodiment of the present technology is not limited to the above-described embodiment and various modifications can be made within the spirit and the scope of the present technology.

Also, the present technology may include the following configurations.

(1)

A transmission device including:
   a generation unit configured to generate first data including control information, which includes information necessary for channel selection of a service, and transmission sequence information indicating a sequence in which the control information is transmitted; and
   a transmission unit configured to transmit the first data in a transmission sequence corresponding to the transmission sequence information along with second data including data of a component included in the service.

(2)

The transmission device according to (1), wherein the transmission sequence information includes
   class information including the number of classes, which number indicates the number of sequences of the control information, and a class ID for identification of a sequence of the control information, and
   version information indicating a version of the control information in each sequence.

(3)

The transmission device according to (2), wherein the class ID is for identification of the control information in each transmission cycle as a different transmission sequence, and
   the transmission unit transmits the first data in such a manner that the control information is transmitted in a transmission cycle corresponding to a transmission sequence.

(4)

The transmission device according to (3), wherein it is identified with the class ID that control information to be updated dynamically in a reception device configured to perform channel selection of the service and control information to be updated statically in the reception device are in different transmission sequences, and
the transmission unit transmits the first data in such a manner that a transmission cycle of the control information to be updated dynamically becomes shorter than a transmission cycle of the control information to be updated statically.

(5)
The transmission device according to any one of (2) to (4), wherein the control information includes, for each service, one or a plurality of descriptors to provide various functions, and the one or the plurality of descriptors is associated to each sequence of the control information.

(6)
The transmission device according to any one of (2) to (4), wherein the control information includes, for each service, one or a plurality of descriptors to provide various functions,
the one or the plurality of descriptors is associated to sequences of the control information, and
priority in updating according to the class ID is assigned to the sequences of the control information.

(7)
The transmission device according to any one of (2) to (6), wherein the first data is an L1 frame in a first layer,
the transmission sequence information is arranged in a header part of the L1 frame, and
the control information is arranged in the header part of the L1 frame.

(8)
The transmission device according to any one of (2) to (6), wherein the first data is an L2 packet in a second layer,
the transmission sequence information is arranged in an extension header in a header part of the L2 packet, and
the control information is arranged in a payload part of the L2 packet.

(9)
The transmission device according to any one of (2) to (6), wherein the first data is an L2 packet in a second layer,
the transmission sequence information is arranged in a payload header in a payload part of the L2 packet, and
the control information is arranged in a payload in the payload part of the L2 packet.

(10)
The transmission device according to (1), wherein the transmission sequence information includes information for identification of a service provider providing a service.

(11)
A transmission method in a transmission device, including the steps of
generating first data including control information, which includes information necessary for channel selection of a service, and transmission sequence information indicating a sequence in which the control information is transmitted; and
transmitting the first data in a transmission sequence corresponding to the transmission sequence information along with second data including data of a component included in the service, the steps being performed by the transmission device.

(12)
A reception device including:
a reception unit configured to receive first data that includes control information, which includes information necessary for channel selection of a service, and transmission sequence information indicating a sequence in which the control information is transmitted and that is transmitted in a transmission sequence corresponding to the transmission sequence information; and
a control unit configured to control processing on second data, which includes data of a component included in the service, on the basis of the control information acquired according to the transmission sequence information.

(13)
The reception device according to (12), wherein the transmission sequence information includes
class information including the number of classes, which number indicates the number of sequences of the control information, and a class ID for identification of a sequence of the control information, and
version information indicating a version of the control information in each sequence.

(14)
The reception device according to (13), wherein the class ID is for identification of the control information in each transmission cycle as a different transmission sequence, and
the reception unit receives the first data transmitted in such a manner that the control information is transmitted in a transmission cycle corresponding to a transmission sequence.

(15)
The reception device according to (14), wherein it is identified with the class ID that control information to be updated dynamically in a reception device configured to perform channel selection of the service and control information to be updated statically in the reception device are in different transmission sequences, and
the reception unit receives the first data transmitted in such a manner that a transmission cycle of the control information to be updated dynamically becomes shorter than a transmission cycle of the control information to be updated statically.

(16)
The reception device according to (13) to (15), wherein the control information includes, for each service, one or a plurality of descriptors to provide various functions, and
the one or the plurality of descriptors is associated to each sequence of the control information.

(17)
The reception device according to (13) to (15), wherein the control information includes, for each service, one or a plurality of descriptors to provide various functions,
the one or the plurality of descriptors is associated to sequences of the control information, and
priority in updating according to the class ID is assigned to the sequences of the control information.

(18)
The reception device according to (13) to (17), wherein the first data is an L1 frame in a first layer,
the transmission sequence information is arranged in a header part of the L1 frame, and
the control information is arranged in the header part of the L1 frame.

(19)
The reception device according to (13) to (17), wherein the first data is an L2 packet in a second layer,
the transmission sequence information is arranged in an extension header in a header part of the L2 packet, and
the control information is arranged in a payload part of the L2 packet.

(20)

The reception device according to (13) to (17), wherein the first data is an L2 packet in a second layer,
the transmission sequence information is arranged in a payload header in a payload part of the L2 packet, and
the control information is arranged in a payload in the payload part of the L2 packet.

(21)

The reception device according to (12), wherein the transmission sequence information includes information for identification of a service provider providing a service.

(22)

A reception method in a reception device, including the steps of:
receiving first data that includes control information, which includes information necessary for channel selection of a service, and transmission sequence information indicating a sequence in which the control information is transmitted and that is transmitted in a transmission sequence corresponding to the transmission sequence information; and
controlling processing on second data, which includes data of a component included in the service, on the basis of the control information acquired according to the transmission sequence information, the steps being performed by the reception device.

REFERENCE SIGNS LIST

1 Transmission system
10 Transmission device
20 Reception device
30 Server
80 Transmission path
90 Internet
111 Component acquisition unit
112 Encoder
113 Signaling generation unit
114 Signaling processing unit
115 Packet generation unit
116 Frame generation unit
117 Transmission unit
212 Tuner
213 Demultiplexer
214 Control unit
215 NVRAM
216 Input unit
217 Communication unit
218 Decoder
219 Output unit
900 Computer
901 CPU

The invention claimed is:

1. A reception device comprising:
A receiver configured to receive first signaling data including control information having information necessary for channel selection of a service, and transmission sequence information indicating a sequence in which the control information is transmitted; and
processing circuitry configured to control processing on second signaling data including data of a component included in the service;
wherein the transmission sequence information includes:
(a) a class ID that identifies a sequence of the control information, the class ID including a provider ID that identifies a provider of the service and a delivery class ID that identifies transmission sequences having different time sequences, and
(b) version information that indicates a version of the control information in each sequence,
wherein the first signaling data is low level signaling (LLS) data and the second signaling data is service layer signaling (SLS) data.

2. The reception device of claim 1 wherein the SLS data is processed according to the control information.

3. The reception device according to claim 1, wherein the class ID identifies the control information in each transmission cycle as a different transmission sequence.

4. The reception device according to claim 3,
wherein the class ID identifies control information that is updated dynamically in the reception device and control information updated statically are in different transmission sequences, and
the receiver receives the first signaling data transmitted in such a manner that a transmission cycle of the control information to be updated dynamically becomes shorter than a transmission cycle of the control information to be updated statically.

5. The reception device according to claim 1,
wherein the control information includes, for each service, one more pieces of information to provide various functions, and
the one or more pieces of information is associated to each sequence of the control information.

6. The reception device according to claim 5,
wherein priority in updating according to the class ID is assigned to the sequences of the control information.

7. The reception device according to claim 1 comprising a television including a display.

8. A reception method operating in a reception device, said method comprising:
receiving, by circuitry of the reception device, low level signaling (LLS) data including control information having information necessary for channel selection of a service, and transmission sequence information indicating a sequence in which the control information is transmitted; and
controlling, by the circuitry of the reception device, processing on service layer signaling (SLS) data including data of a component included in the service;
wherein the transmission sequence information includes:
(a) a class ID that identifies a sequence of the control information, the class ID including a provider ID that identifies a provider of the service and a delivery class ID that identifies transmission sequences having different time sequences, and
(b) version information that indicates a version of the control information in each sequence.

9. The reception method of claim 8 wherein the reception device comprises a television including a display.

10. A transmission method operating in a transmission device, said method comprising:
generating, by circuitry of the transmission device, first signaling data including control information having information necessary for channel selection of a service, and transmission sequence information indicating a sequence in which the control information is transmitted,
wherein the transmission sequence information includes:
(a) a class ID that identifies a sequence of the control information, the class ID including a provider ID that identifies a provider of the service and a delivery class ID that identifies transmission sequences having different time sequences, and
(b) version information indicating a version of the control information in each sequence; and transmitting, by the circuitry of the transmission device, the first signaling data according to the transmission sequence information;

wherein the first signaling data is low level signaling (LLS) data and the second signaling data is service layer signaling (SLS) data.

11. The transmission method of claim 10, wherein the transmission sequence is an N-bit number segmented into consecutive first and second parts, the first part corresponding to the class ID, and the second part corresponding to the version information.

12. The transmission method of claim 10, wherein the first signaling data is transmitted in an IP packet of an L1 frame, and a header of the L1 frame includes information indicating that the L1 frame includes the first data.

13. The transmission method of claim 10, wherein the first signaling data is transmitted along with the second signaling data including data of a component included in the service.

14. The transmission method according to claim 10, wherein the delivery class ID is a delivery group ID.

* * * * *